Oct. 11, 1949.  A. W. MILLS  2,484,111
RECORD PERFORATING MACHINE
Filed Aug. 17, 1945  18 Sheets-Sheet 3

INVENTOR
A.W. MILLS
BY
ATTORNEY

Oct. 11, 1949.   A. W. MILLS   2,484,111
RECORD PERFORATING MACHINE
Filed Aug. 17, 1945   18 Sheets-Sheet 10

INVENTOR
A. W. MILLS
BY
ATTORNEY

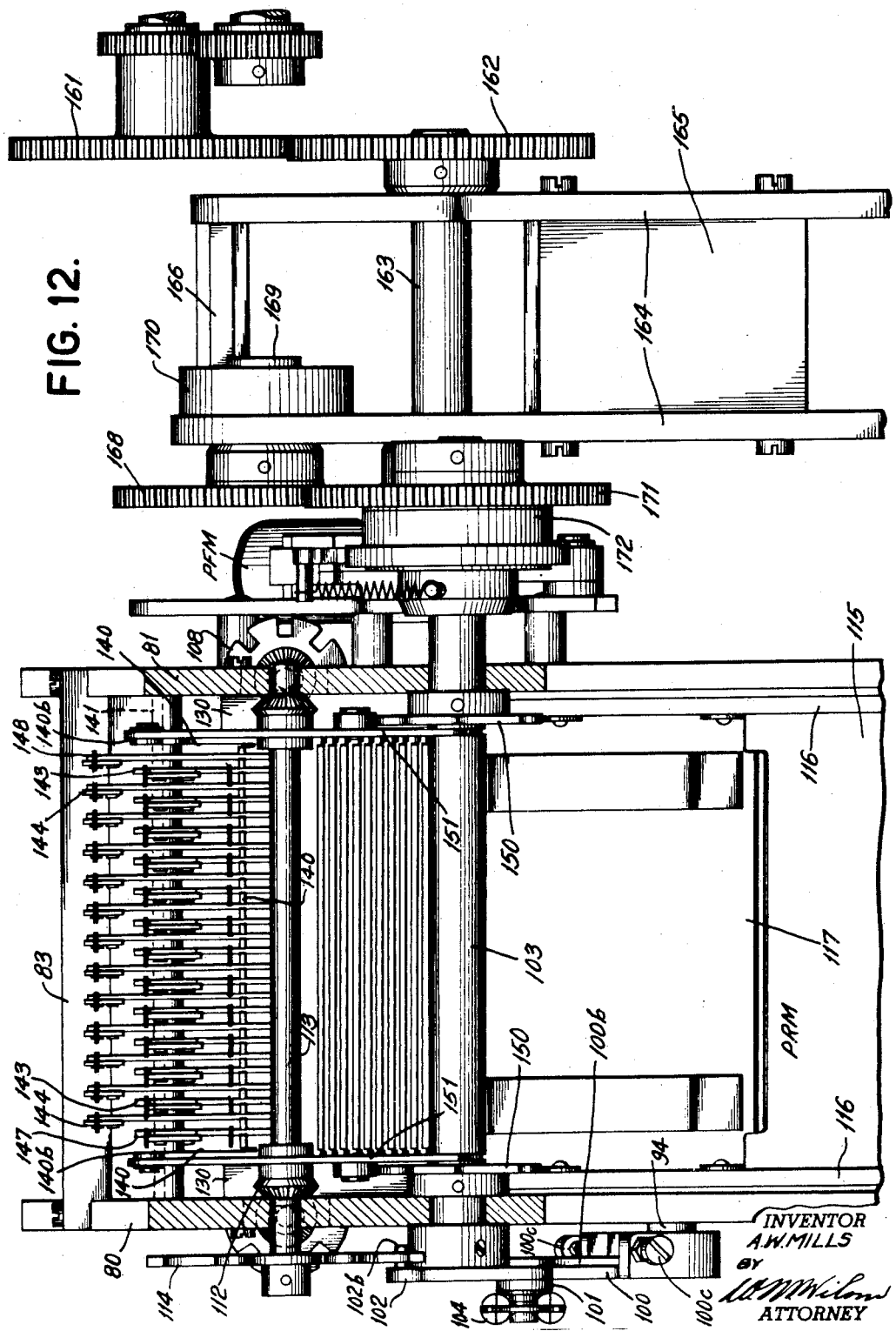

Oct. 11, 1949.   A. W. MILLS   2,484,111
RECORD PERFORATING MACHINE
Filed Aug. 17, 1945   18 Sheets-Sheet 12
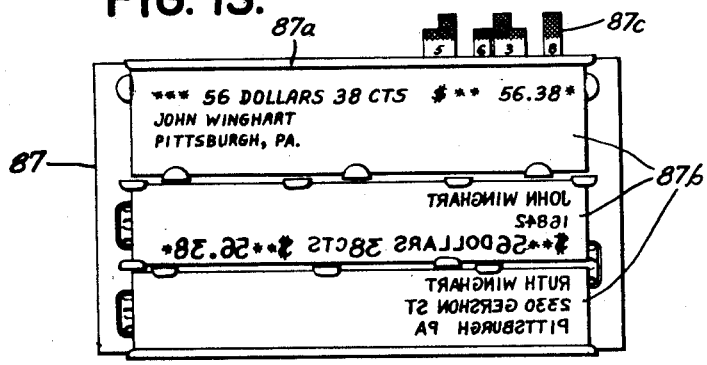
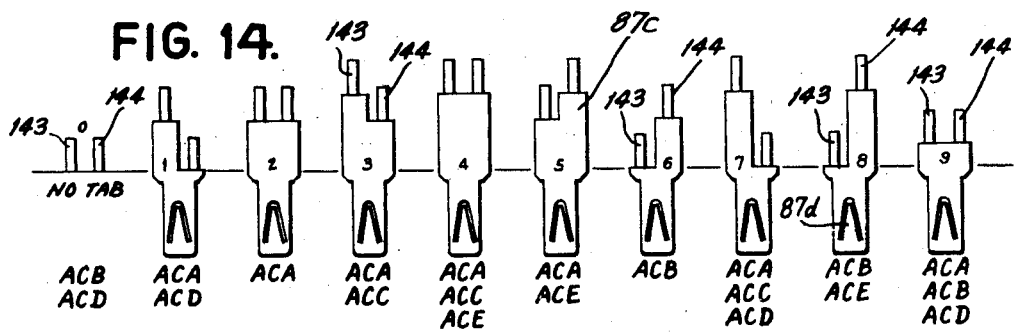
INVENTOR
A. W. MILLS
BY
ATTORNEY

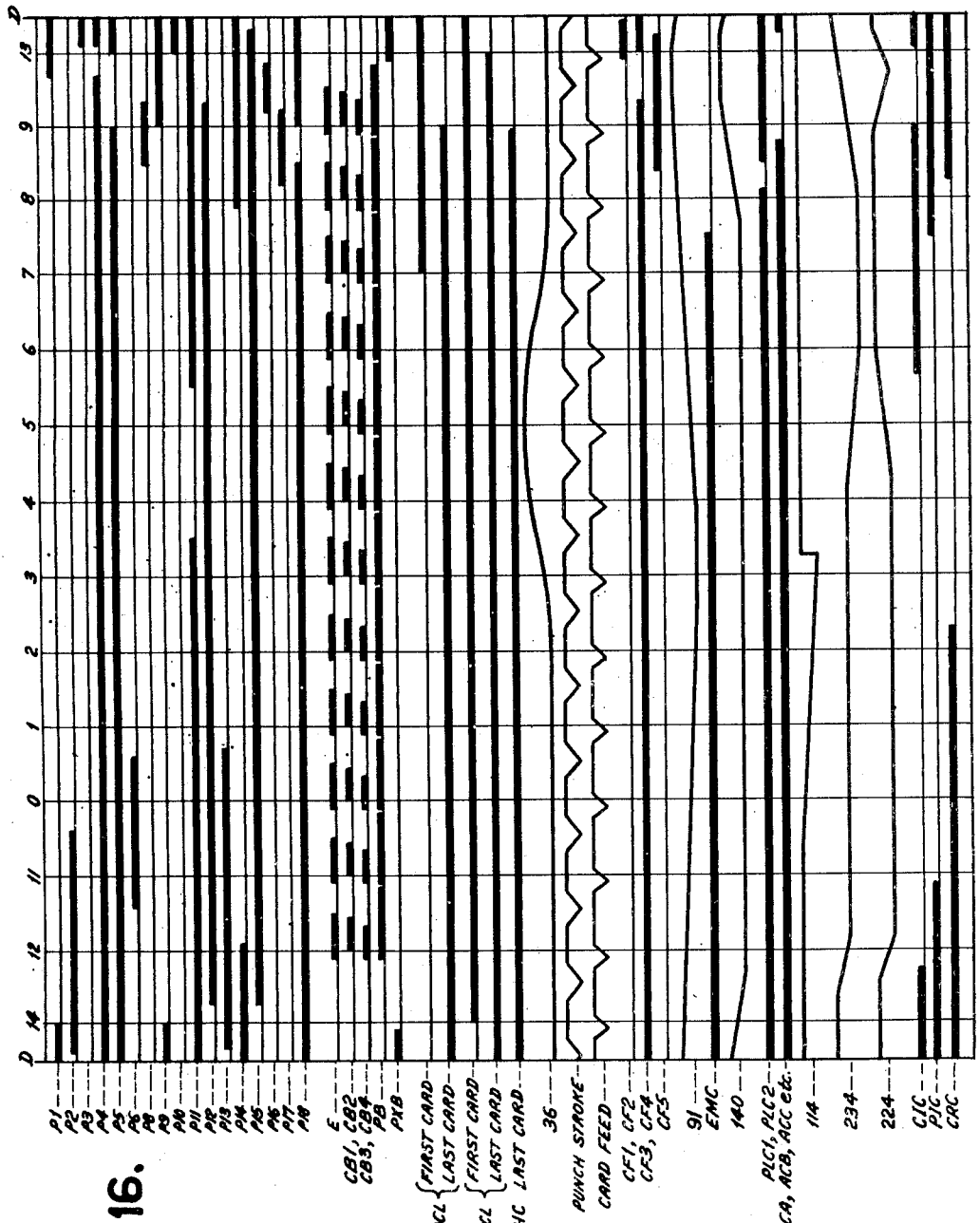

Oct. 11, 1949.   A. W. MILLS   2,484,111
RECORD PERFORATING MACHINE
Filed Aug. 17, 1945   18 Sheets-Sheet 16
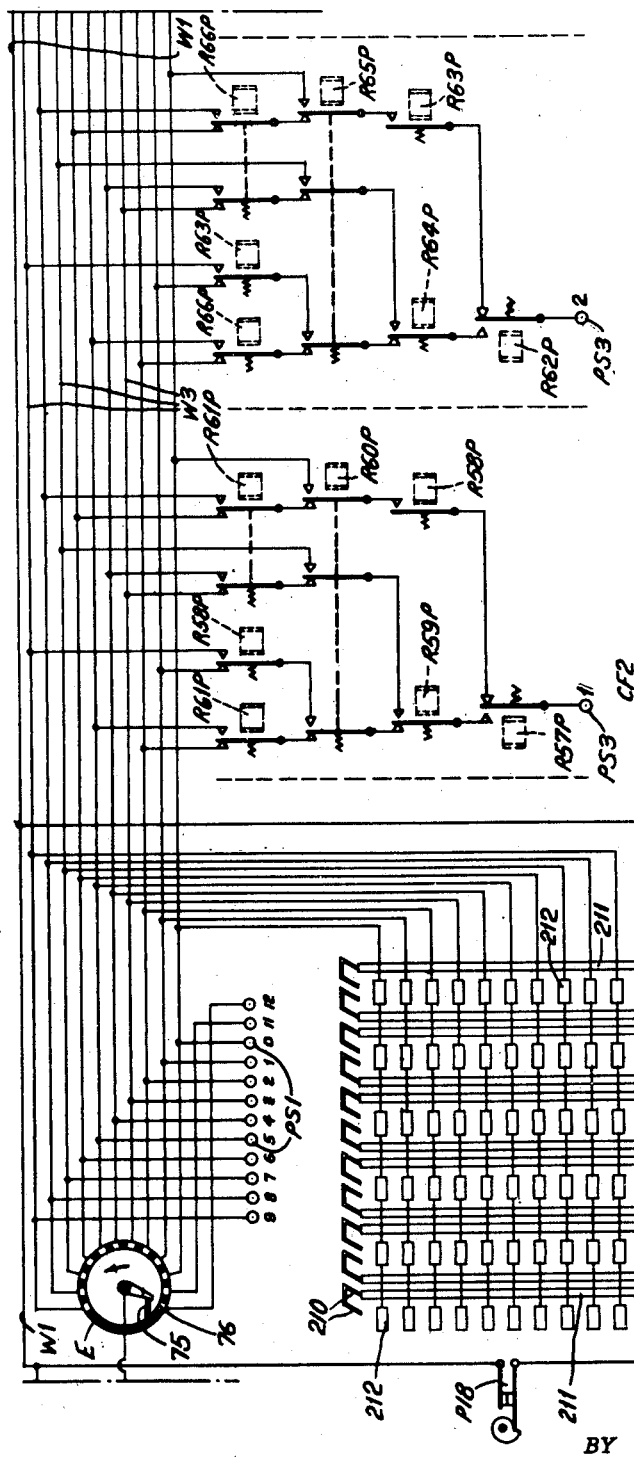
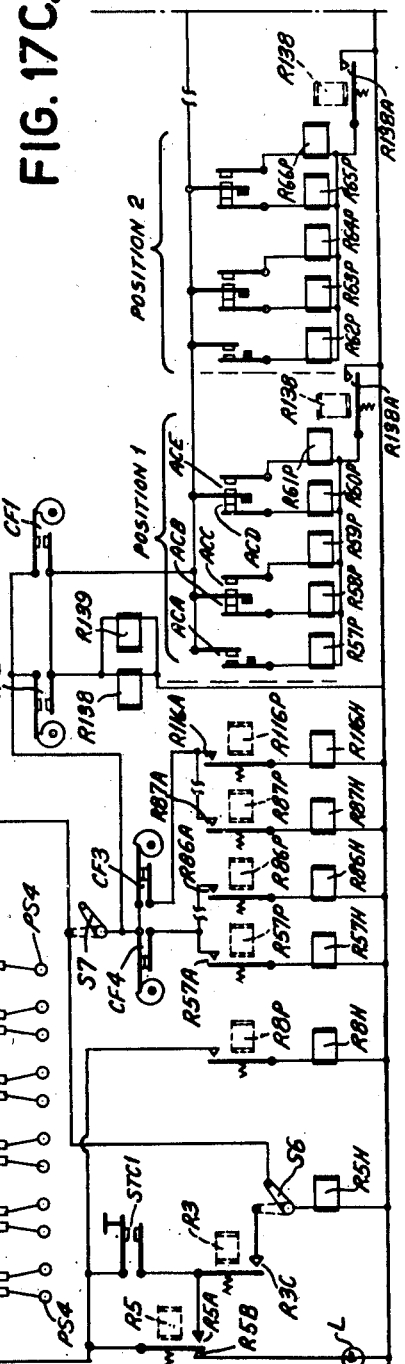
FIG. 17C.
INVENTOR
A. W. MILLS
BY
ATTORNEY Oct. 11, 1949.  A. W. MILLS  2,484,111
RECORD PERFORATING MACHINE
Filed Aug. 17, 1945  18 Sheets-Sheet 17

INVENTOR
A. W. MILLS
BY
ATTORNEY

Patented Oct. 11, 1949

2,484,111

UNITED STATES PATENT OFFICE 2,484,111

RECORD PERFORATING MACHINE

Albert W. Mills, Endicott, N. Y., assignor to International Business Machines Corporation, New York, N. Y., a corporation of New York Application August 17, 1945, Serial No. 610,894

16 Claims. (Cl. 164—115)

This invention relates to machines for perforating accounting and statistical record cards.

An object of the invention is to provide a machine capable of perforating records under control of addressing machine plates.

An object of the invention is to provide a machine for perforating accounting and statistical record cards with data derived from designations on addressing machine plates.

An object is to provide an improved analyzing and translating mechanism for converting data designations of one form into data designations of a different form.

An object is to provide an analyzing mechanism for translating data designations on addressing machine plates into punched data on accounting and statistical cards.

An object is to provide a sensing and analyzing mechanism capable of translating data represented by tabs removably attached to addressing machine printing members or plates into data designating perforations on accounting and statistical records.

An object is to provide a novel electric sensing and translating mechanism for converting data designations of one form into data designations of another form.

An object is to provide a mechanism for converting data represented by stepped tabs attached to printing plates or members into a different form of representation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 6A is a large scale view of the counter interlock contacts.

Fig. 7A is a section on the line 7a—7a in Fig. 7.

Fig. 9A is a detail sectional view of the plate lever contacts.

Fig. 12 is a section on the line 12—12 in Fig. 7.

Fig. 13 is a view of the face of one of the addressing plates.

Fig. 14 is a view showing the different kinds of plate tabs.

Fig. 15 is a view of a specimen card.

Fig. 16 is a timing chart.

Figs. 17A to 17D comprise a wiring diagram.

Figure 18:
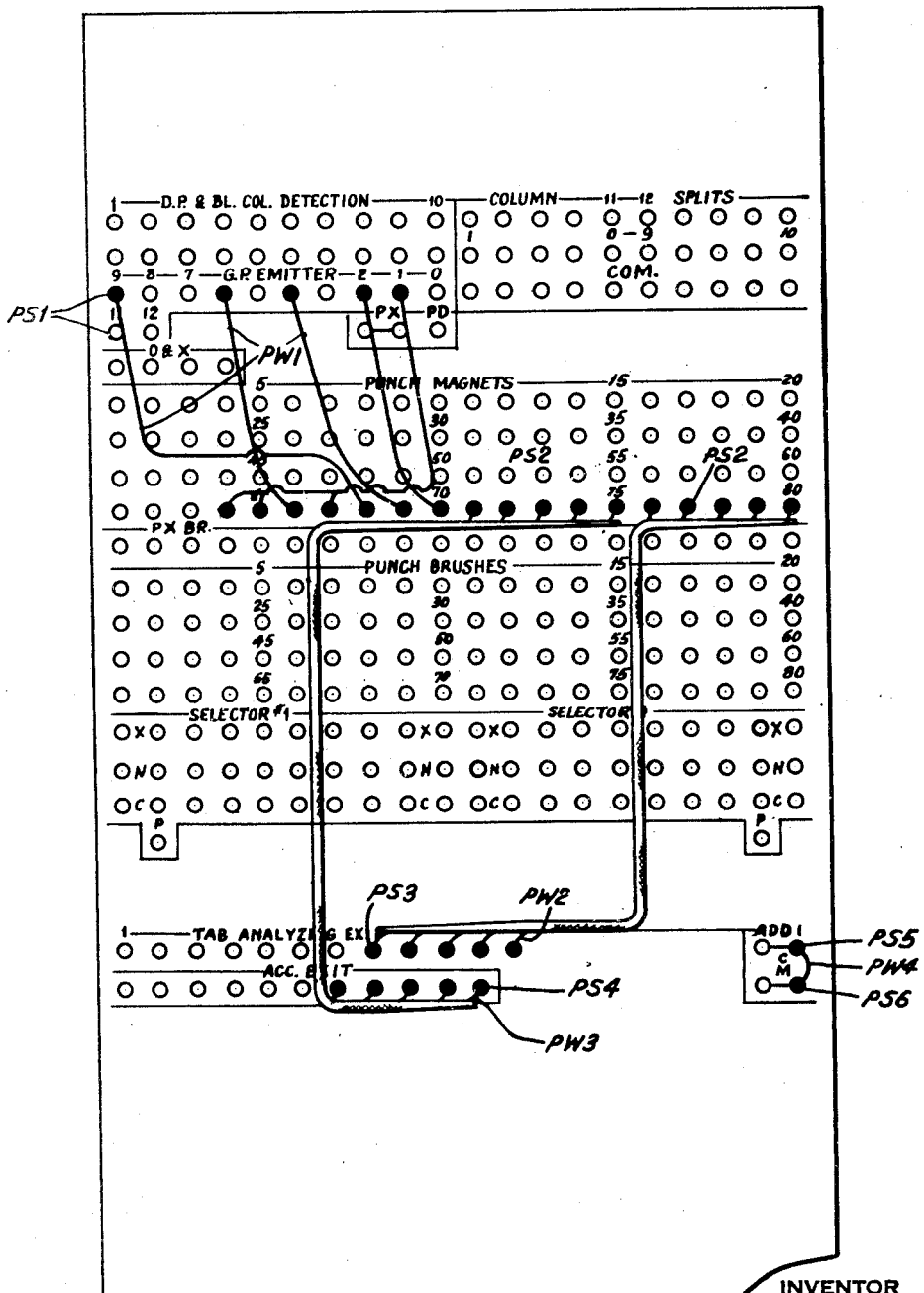

Fig. 18 is a view of the plugboard showing diagrammatically how the machine is plugged.

The machine comprises three main sections or groups of mechanisms; namely: a record card feeding and perforating section, a mechanism for feeding and analyzing addressing machine plates, and a counter which may be used to serially number punch cards and also to repeatedly punch certain data which is to appear on all of the cards. The foregoing are all mounted upon a base 30 (Figs. 1 and 2) supported by the legs 31 which are braced by suitable rods or tubes 32.

The reference numeral 33 designates the card feeding and punching section which forms the bulk of the machine and covers substantially the entire top of the base 30. The plate feeding and analyzing mechanism is generally designated 34 and is mounted on the base 30 at the rear of the punching and feeding section 33. The counter section is designated 35 and is mounted on the base 30 at the left-hand end of the machine approximately in alignment with the plate feeding and analyzing section 34. These mechanisms will be described in the above order.

The card feeding and punching mechanism is of the same general construction and mode of operation as the one described in Patent Re. 21,133, granted June 27, 1939, to C. D. Lake, consequently, only a very brief description will be given herein. The cards to be perforated are placed in a punch hopper PH (Figs. 1, 2, and 3) of conventional form. The cards are fed horizontally from the hopper PH by means of a picker mechanism generally designated 36 which includes the horizontal shaft 37 to which are secured the sectors 38 meshing with rack teeth on the pickers 36 whereby the rocking of the shaft 37 clockwise in Fig. 3 causes the pickers 36 to eject the lowest card in the hopper PH to the right.

Ordinarily, in a machine of this type, the shaft 37 is directly oscillated by a cam 39 (Fig. 3) driven one revolution per card cycle by suitable gearing (not shown) so that cards continue to feed from the hopper as long as any remain. The cam 39 ordinarily directly actuates a cam follower 40 which is fixed to the shaft 37. In the present case, however, provision is made for stopping the ejection of cards under certain conditions, notwithstanding the fact that the punch hopper PH may not be exhausted of cards. In the present case the cam follower 40 is not fixed to the shaft 37 but is fixed to a short shaft (not shown) in axial alignment with shaft 37 and journaled in the side frame 41 and in a support plate 42 spaced from the side plate 41. Secured to this short shaft is an arm 43 having a notch 43a. Secured to the shaft 37 is an arm 44 which is urged in a counterclockwise direction by a spring 45 anchored to a pin carried by the plate 42 and to a pin carried by the lever 44, the spring 45 holding the lever 44 against a stop screw 46 carried by plate 42. Pivoted on the lever 44 is a clutch dog 47 having a tooth held in the notch 43a by a spring 48 anchored to the dog 47 and to the pin on lever 44 to which the spring 45 is anchored.

Under normal conditions, the arm 43 will be oscillated by the cam 39 and cam follower 40 and, owing to the presence of the tooth of the dog 47 in the notch 43a, the shaft 37 will be clutched to the arm 43 and will likewise be oscillated. Thus the cards will be ejected from the magazine at the rate of one per machine cycle.

As a means of preventing the ejection of cards there is provided the card feeding magnet CFM (Fig. 3) with which cooperates an armature 49 pivoted at 50, this armature normally being held by a spring 51 against a stop screw 52 and, in this position, the end of the armature is clear of the tail 47a of the dog 47. However, if the magnet CFM is energized at the proper time in the card feeding cycle, it will attract its armature 49 and place it in the path of the tail 47a of dog 47 when the picker 36 is being returned to the left preparatory to picking up another card and rock the dog 47 in a counterclockwise direction to disengage the tooth thereon from the notch 43a. This allows the arm 43 to oscillate idly and prevents ejecting a card from the hopper PH as long as a magnet CFM is kept energized. On account of the fact that it is necessary to provide the spring 45 to hold the picker mechanism in a definite position while the arm 43 is oscillating idly, the cam follower 40 is provided with two arms both cooperating with the cam 39 whereby the arm 43 is actuated positively in both directions.

Each card ejected from the punch hopper PH is pushed into the first feed rollers 53 (Fig. 3) which advance the card past the punches 54 and punch die 54a to a second set of feed rollers 55. The latter feed rollers, in turn, transport the card past the punch brushes PB and the punch contact roller PCR to a third set of feed rollers 56 from which the card passes to the card receiving pocket RP.

Figure 2:
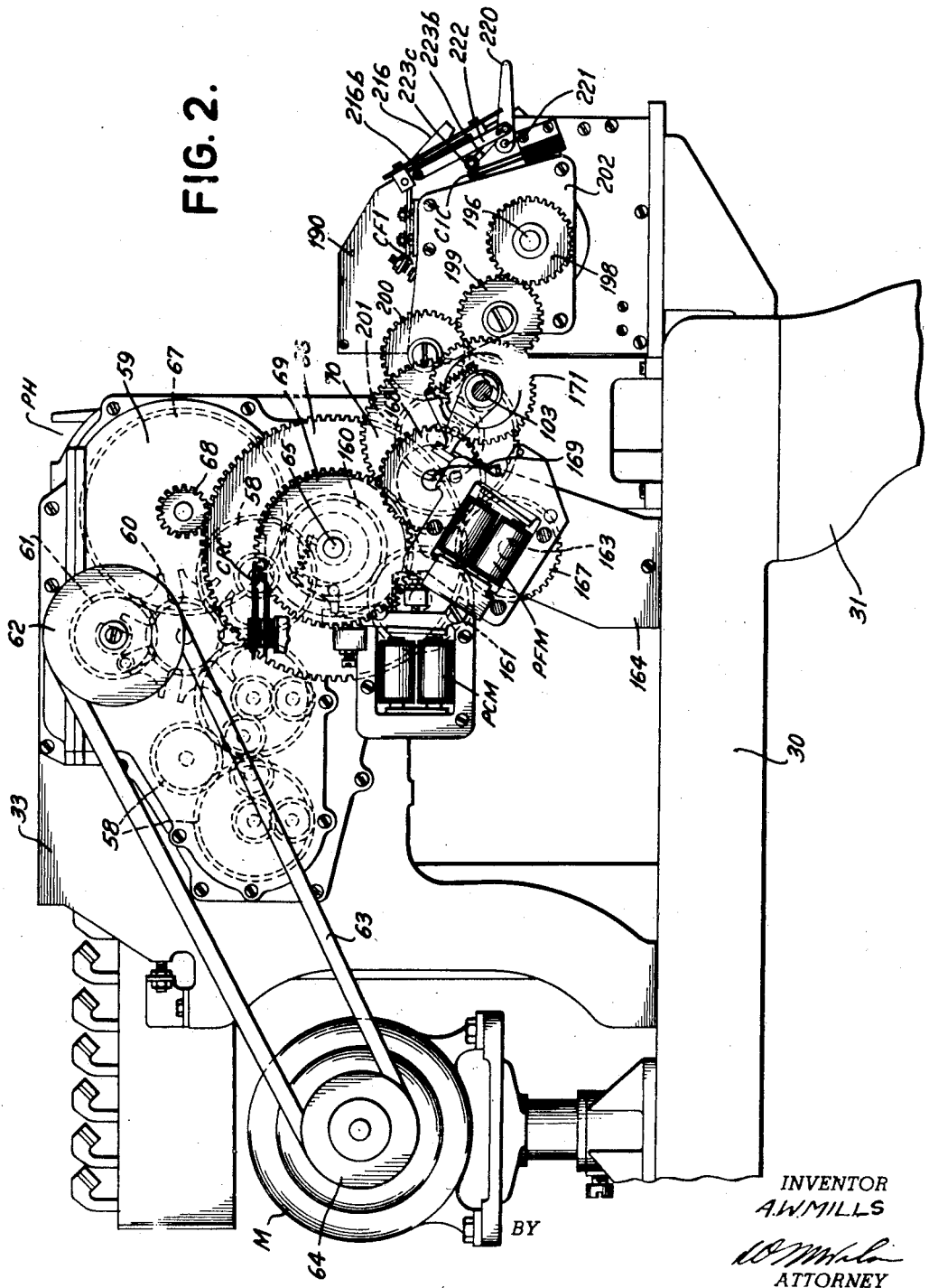
Fig. 2 is a rear elevation of the machine with the addressing plate feeding mechanism removed.

The feed rollers 53, 55, 57 and the contact roller PCR are driven by gearing shown in dotted lines in Fig. 2 and generally designated 58 contained in a gear housing 59. The picker cam 39 is also driven by this gearing through a gear not shown. The gearing 58 drives the feed rollers 53, 55, and 56 intermittently, rather than at a uniform rate, through a Geneva drive mechanism described in Patent Re. 21,133 which includes the Geneva driven disk 60 (Fig. 2) and Geneva drive disk 61. The Geneva drive disk 61 is driven by the main drive pulley 62 through the belt 63 and the pulley 64 on the shaft of the main drive motor M. The Geneva drive mechanism however, is not normally effective to drive the feed rollers 53, 55, and 56 unless a shaft 65 is clutched to a main drive gear 66 loose on the shaft 65. The clutch is controlled by the punch clutch magnet PCM and the gear 66 is driven by the motor M through a train of gears consisting of the large gear 67, meshing with teeth on the Geneva drive disk 61, and a pinion 68 secured to the gear 67 and meshing with gear 66. The internal connection by means of which the rotation of shaft 65 renders the Geneva drive 60, 61 effective is not shown but is described in the above patent. In so far as the invention disclosed herein is concerned any suitable means may be used to drive the feed rollers and picker mechanism.

When the clutch magnet PCM is energized it renders effective a one-revolution clutch of conventional form which couples the shaft 65 and a gear 69 secured to the shaft to the gear 66 which rotates continually. The gear 69 meshes with a gear 70 secured to a shaft which actuates certain cam operated contacts designated P1 to P18 (Figs. 16, and 17A to 17D) which are used to time the operation of certain mechanisms and circuits.

The gearing is such that the gear 66 is driven at the rate of one revolution per card cycle. This gear 66 is known as the index gear and has 140 teeth, each tooth representing $\frac{1}{10}$ of an index point movement of a card in course of feed. Thus, when the gear 66 turns through 10 teeth, the card will be fed one index-point position and, owing to the Geneva drive mechanism, it will stop momentarily while the punches 54 pass through the card.

The punch brushes PB are so spaced from the punches 54 that while the punches are punching a given index-point position of one card, the brushes PB will be bearing on the corresponding positions of the card which was fed immediately preceding the card being punched. The contact roller PCR is provided with the usual common brush PCB. The machine is also provided with the usual punch X brushes designated PXB in Fig. 3 which coact with a common contact strip designated PXC.

The hopper PH is provided with the usual hopper contacts PHC (Fig. 3) which are kept closed by a lever 71 as long as there are cards in the hopper PH. The usual die card lever contacts DCL are actuated by a lever 72 which is engaged by each card ejected from the hopper PH and is operative to close the contacts DCL when the ejected card is about to pass underneath the punches 54. The machine is also provided with the card lever contacts PCL which are closed by a lever 73 when a card passes underneath the contact roller PCR. These contacts are part of the usual equipment of a punching mechanism such as the one disclosed in the above patent.

When a card is ejected from the hopper PH, it first closes the die lever contacts DCL and, a little more than one cycle later, closes the contacts PCL. When the last card leaves the hopper PH, the lever 71 passes through a hole in the usual follower plate 74 and permits the contacts PHC to open.

The machine is equipped with an emitter designated E in Fig. 17C, called the gang punch emitter, which is driven by suitable gearing so as to make one revolution per card cycle. Conveniently this emitter may be driven by the shaft to which gear 70 is secured. This emitter is of a form commonly used in record controlled machines and is arranged so that the brush 75 travels over the contacts or segments 76 in synchronism with the traversing of the card columns by the punch brushes PB. In the present machine the card columns are sensed "12" positions first and "9" positions last in the order shown at the top in Fig. 16 in which the numbers correspond to the index-point positions of the card except for the 13th and 14th positions which correspond to the leading and trailing edges of the cards.

The plate feeding and analyzing mechanism is shown in Figs. 1 and 7 to 12 inclusive. This mechanism is supported by a frame work which includes the side plates 80, 81 secured to a suitable horizontal plate (not shown) fastened to the top of the base 30. The plates 80, 81 are joined together by bars 82 and 83 (Figs. 8, 9, and 10) and by a plate 84 forming the bottom of the addressing plate hopper or magazine APH. The latter includes the back plate 85 and the side plates 86 (Figs. 1 and 7 to 10) secured at their lower ends to the plates 80 and 81 and inclined slightly to prevent the pile of addressing plates 87 from falling out of the magazine. The plate hopper APH is provided with a follower plate or weight 88 resting on the top plate of the pile.

The plate 84 (Figs. 9 and 10) has secured to its underside a block 89 on which is pivoted a lever 90 one arm of which extends upwardly through a hole in the plate 84 to engage the bottom address plate 87. The other arm of the lever 90 holds the full magazine contacts FMC closed when the hopper APH is full but, when the last plate 87 is ejected from the hopper, the lever 90 rocks counterclockwise in Fig. 9 into an opening in the follower plate 88 permitting the contacts FMC to open.

The plates 87 are ejected from the magazine or hopper APH by means of pickers 91 (Figs. 7 to 10) which are slidably mounted on guide rods 92 and joined together at their left-hand ends by a cross bar 91a. The pickers 91 are formed with rack teeth meshing with gear sectors 93 secured to a shaft 94 journaled in the plate 80, 81. The plates in the hopper APH do not rest directly upon the plate 84 but upon angle strips 95, the top surfaces of which are slightly below the top surfaces of the pickers 91. In Fig. 9 the pickers 91 are shown only partly retracted and the plates 87 are resting on the tops of the angle strips 95. When the pickers are fully retracted to the left (Fig. 9), the stack of plates 87 will rest on the flange members 95 with the body of the lowest plate in horizontal alignment with the right-hand ends of the pickers 91. In other words, in Fig. 9, with movement of the pickers 91 to the left, the plates 87 will be allowed to drop a short distance so that the bottom plate in the stack is a little below the top surface of the pickers 91. Thus, if the pickers 91 are thereafter thrust to the right, the lowest plate in the stack will be pushed to the right by the pickers 91.

In order to prevent more than one plate at a time from being ejected from the plate hopper APH, there is provided a pair of throat blocks 96 (Figs. 8, 9, and 10) secured at 97 to the side plates 81, there being a throat block for each of the upper corners of the plates with reference to Fig. 13. The throat blocks are formed with the curved guide surfaces 96a which force the plates 87 toward the plate 85 so that the lowermost four or five plates in the stack will be guided in vertical alignment. The throat blocks also have horizontal slots 96b which are located on a level with the lowest plate in the stack when said plate rests upon the members 95. The upper edges of the slots 96b are positioned to permit the lowest plate in the stack to pass to the right but the guide surface 96a prevents the remaining plates from being carried along by friction.

The plate 84 is secured to the plate 85 (Figs. 8, 9, and 10) and also to horizontal extensions 96c of the throat blocks 96. These horizontal extensions also have threaded holes which receive the threaded right-hand ends of the picker guide rods 92 (Fig. 9) which are slotted at their left-hand ends to enable the rods to be screwed into the threaded holes in extensions 96c. Thus the throat blocks serve not only to prevent more than one plate 87a from being ejected from the hopper APH, but also provide support for the plate 84 which is narrower than the space between the pickers 91 to permit said pickers to pass to the right far enough to fully eject the bottom plate 87 from the magazine.

Figure 7:
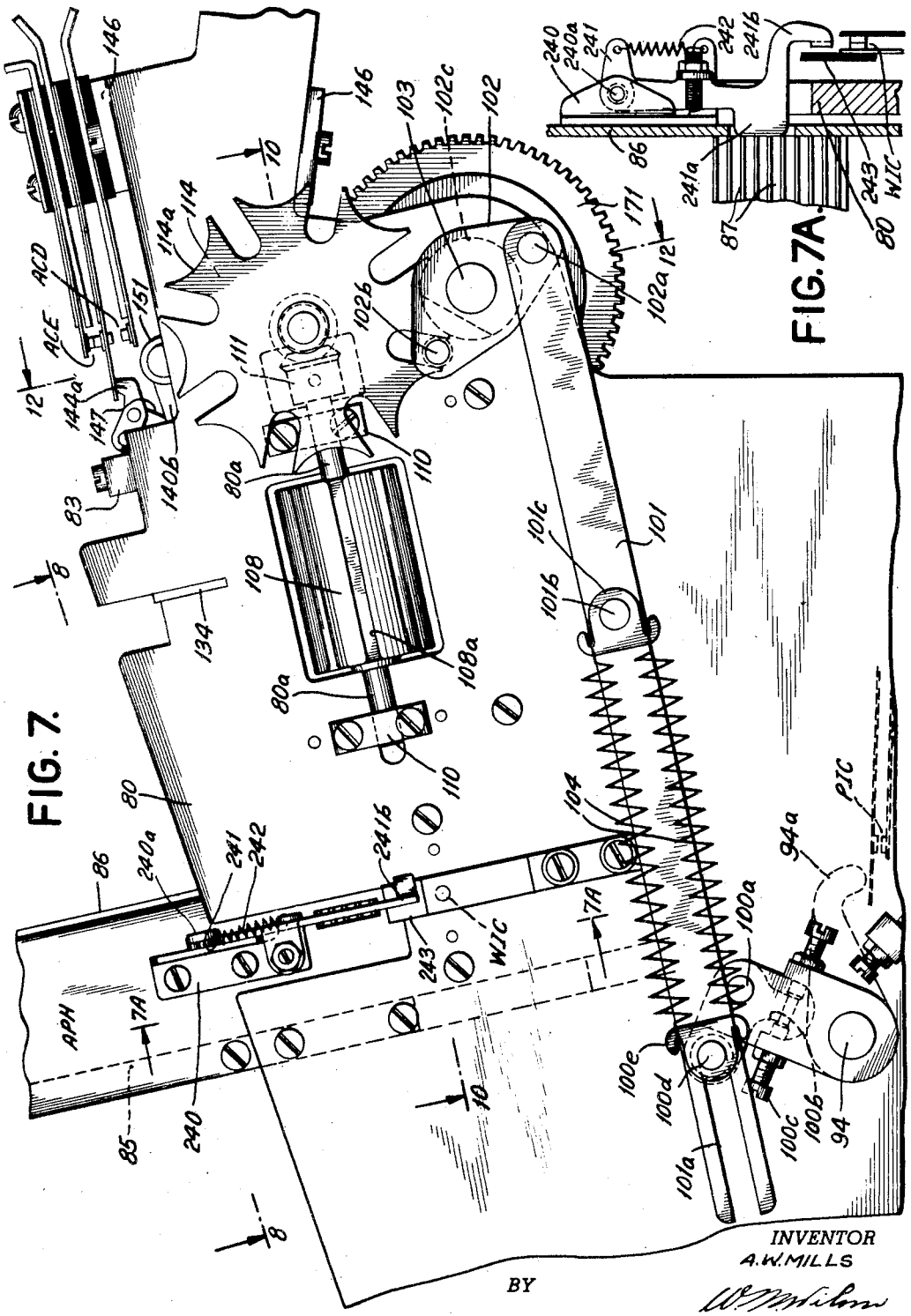
Fig. 7 is a rear view of the plate feeding and analyzing mechanism.
Figure 8:
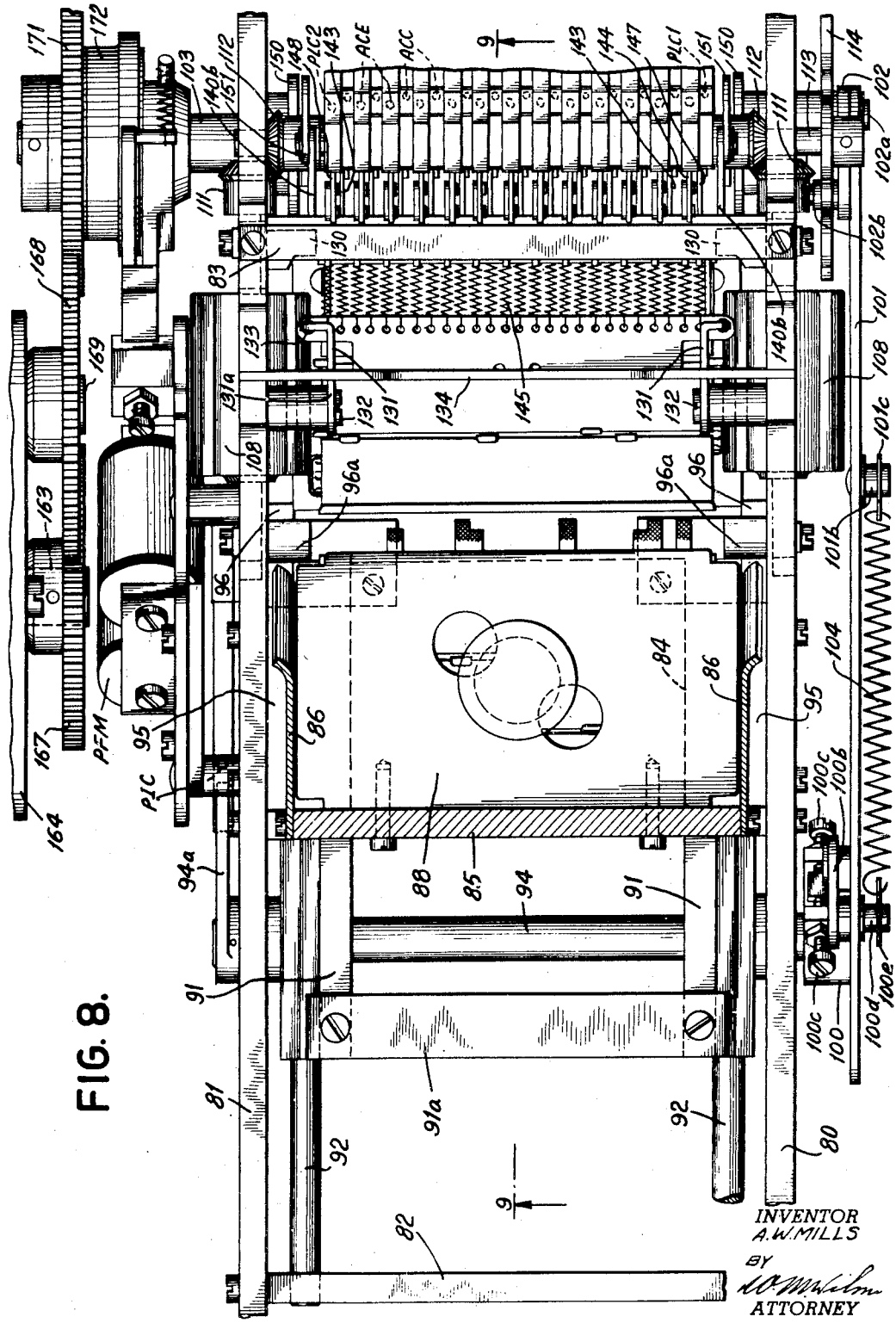
Fig. 8 is an inclined section on the line 8—8 in Fig. 7.
Figure 9:
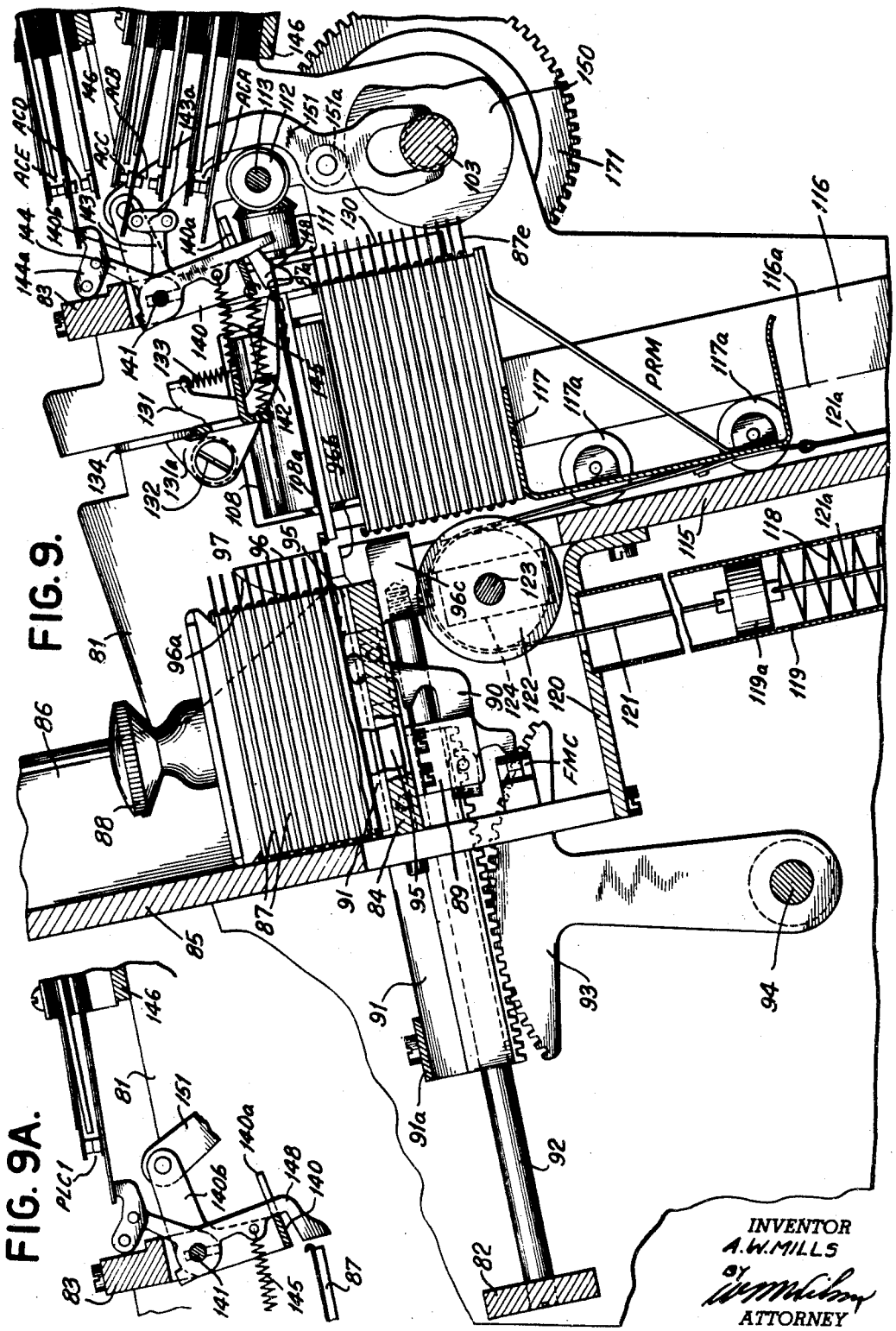
Fig 9 is a vertical section on the line 9—9 in Fig. 8.
Figure 10:
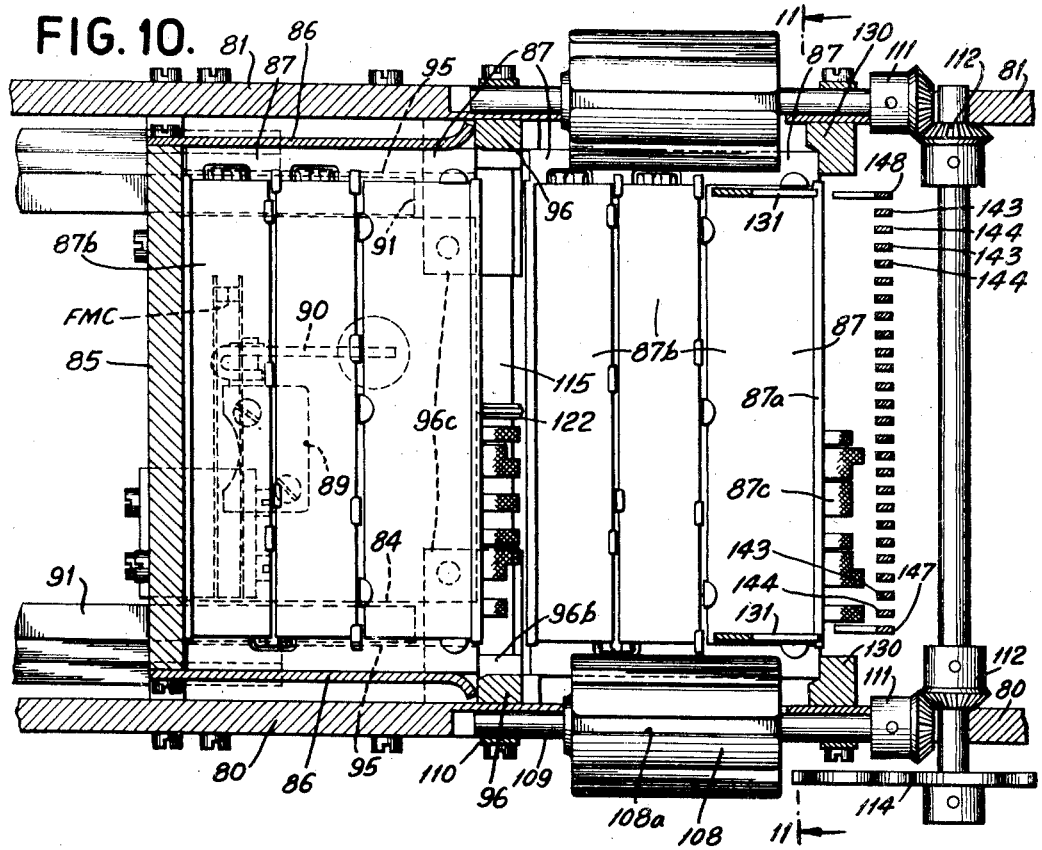
Fig. 10 is a section on the line 10—10 in Fig. 7.

The picker shaft 94 is oscillated by mechanism shown in Figs. 7, 8, and 12. This mechanism includes an arm 100 secured to the shaft 94 outside of the plate 80. This arm 100 has pivoted to it at 100a a lever 100b one arm of which is located between two stop screws 100c carried by the arm 100, this arm being recessed to receive the arm of lever 100 cooperating with the stop screws 100c. The lever 100b is provided with a pin 100d which projects through a slot 101a in a link 101 which is pivoted at 102a to a crank lever 102 secured to a shaft 103. The shaft 103 is journaled in the plates 80, 81 and is the main drive shaft of the plate feeding section of the machine. The link 101 is provided with a pin 101b having a spring anchoring clip 101c to which is anchored the springs 104, the other ends of which are anchored to a similar clip 101e attached to the pin 100d. The springs 104 are normally under sufficient tension to keep the pin 101d at the right-hand end of the slot 101a.

When the shaft 103 is rotated one revolution in a clockwise direction, the link 101 will be thrust to the left to rock the arm 100 and shaft 94 to retract the pickers by moving them to the left in Fig. 9 and thereafter the pickers will be thrust to the right to eject a plate 87 from the plate hopper APH. The plate ejected from the magazine is guided by grooves 108a in two parallel stacker drums 108 to the tab analyzing position at the top of the plate receiving magazine PRM.

The stacker drums 108 are secured to shafts 109 which are journaled in slots 80a formed in the plate 80 and are held in said slots by straps 110 secured to said plate. The stacker drums 108 are rotated, the left one (Fig. 11) clockwise and the right one counterclockwise, by means of bevel gears 111 secured to the shafts 109. These bevel gears mesh with bevel gears 112 secured to a shaft 113 journaled in the plates 80, 81 above the shaft 103.

The shaft 113 is driven by a Geneva gear mechanism which comprises the Geneva disc 114 secured to the shaft 113 and the drive pin 102b carried by the crank lever 102. The hub of the crank lever 102 is formed as a Geneva locking surface 102c cooperating with the locking surfaces 114a of the Geneva disc 114. When the shaft 103 is rotated clockwise to retract the pickers 91 preparatory to ejecting a plate 87 from the magazine, the pin 102b rotates the Geneva disc 114 one-eighth of a revolution counterclockwise thereby rotating the stacker drums 108 one-eighth of a revolution. This results in lowering the plate 87 (Fig.

11) which was previously ejected from the magazine and placing said plate on top of the stack of plates previously analyzed.

The spacing of the slots in the stacker drums 108 is such (Fig. 11) that the stacker drums not only lower the previously ejected plate but also press down the stack of plates slightly and prevent said plates from springing upwardly under the influence of the spring which conuterbalances the weight of the stack of plates.

The plate receiving magazine PRM includes a back plate 115 (Figs. 1, 9, 10, and 12) which is secured to the plates 80, 81 and extends diagonally downwardly from a point below the throat blocks 96 (Fig. 9). Secured to the sides of this plate 115 are the magazine side guide assemblies 116 each of which is designed to form a groove 116a receiving the wheels 117a of the platform 117 supporting the stack of plates upon discharge by the stacker drums 108.

The weight of the plates stacked on the platform 117 (Fig. 9) is counterbalanced by a tension spring 118 which is received in a tube 119. The lower end of the tube is suitably secured to the lower end of the plate 115 while the upper end is received in a socket formed in a bracket 120 secured to the plates 85 and 115 respectively. The lower end of the spring 117 is attached to the lower end of the tube 119 while the upper end of the spring is attached to a sliding plug 119a to which is fastened a cord or cable 121. The latter passes around a pulley 122 journaled on a stud 123 carried by blocks 124 secured to the plate 115, the latter being provided with a slot to accommodate the pulley 122. From the pulley 122 the cord 121 passes downwardly and is secured to the platform 117.

A second cord 121a is attached to the plug 119a and extends downwardly through the center of the tube 119 and through a hole in the bottom of the tube. The cord then passes around a pulley (not shown) at the bottom of the tube and upwardly in front of the plate 115 and is attached to the plate platform 117. The lower end of the tube 119 may be provided with a suitable orifice to permit air to enter the lower end of the tube at a slow rate. When the plate platform 117 is fully loaded with a stack of plates 87 and the plates are removed, the spring 118 draws the plug 119a downwardly and thereby actuates the cord 121 to raise the platform 117 as far as it will go. Owing to the air trapped in the lower part of the tube 119 being unable to escape very rapidly through the orifice, the final portion of the upward movement of the platform 117 is effected slowly, the plug 119a and the tube 119 acting as a dashpot to prevent the platform 117 from slamming up against the stacker drums 108. The cord 121a prevents the platform 117 from bouncing upwardly when the weight of the plates is first removed from the platform 117. Without the cord 121a the initially rapid movement of the plug 119a until the air is sufficiently compressed in the tube 119 would cause the platform to become accelerated rapidly which would continue when the motion of the plug is checked by the compression of the air. Thus, the effect is to compel the platform 117 to travel with decelerated velocity.

Figure 1:
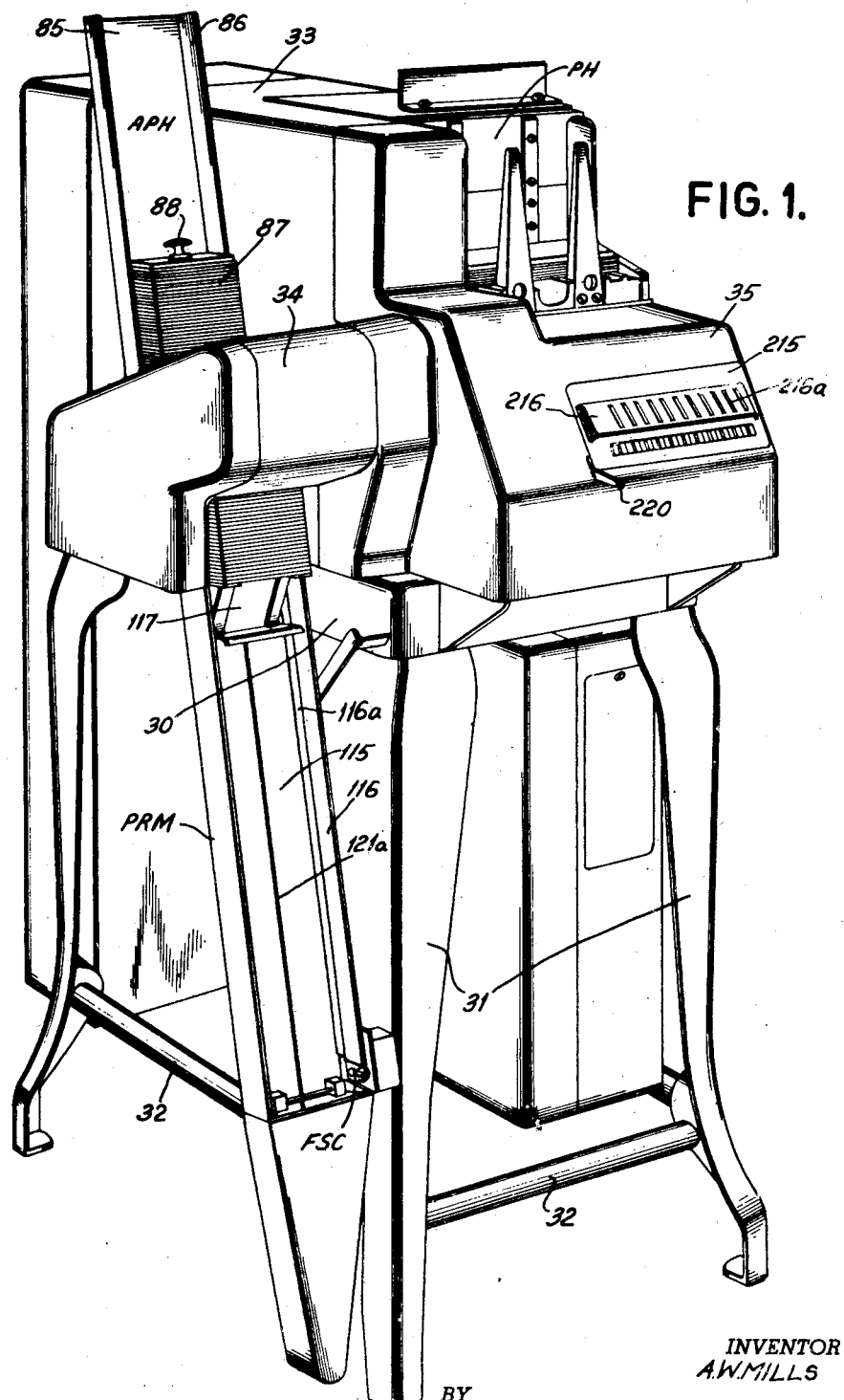
Fig. 1 is a perspective view showing at the left the rear side and at the right the left-hand side, respectively, of the machine.
Figure 11:
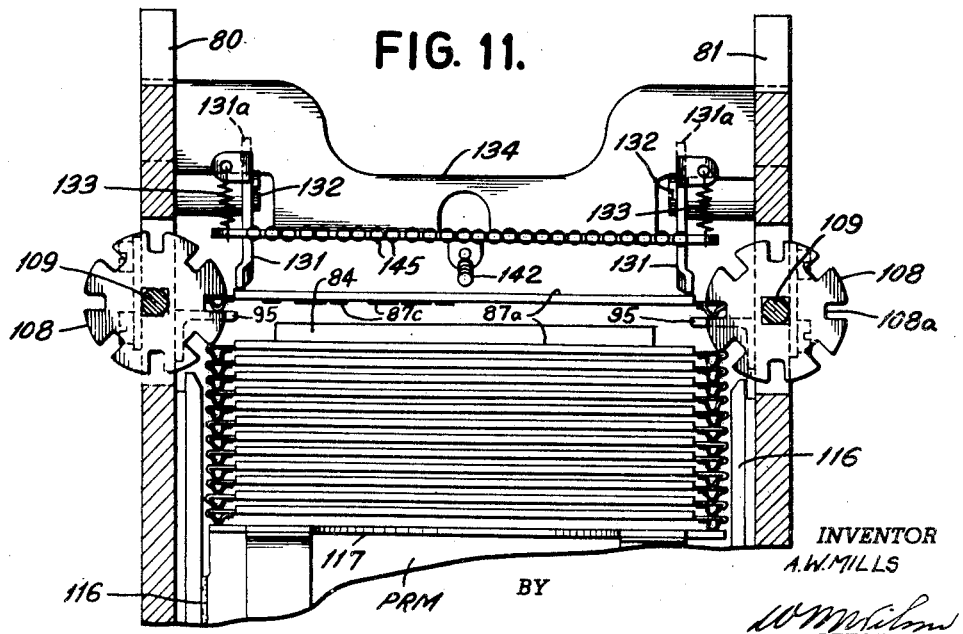
Fig. 11 is a section on the line 11—11 in Fig. 10.

The progressive stacking of plates 87 on the platform 117 by the operation of the stacker drums 108 causes the platform 117 to gradually descend from the position of Fig. 1. The spring 118 is strong enough to cause the stack of plates on the platform 117 to be pressed upwardly against one of the ribs of each of the stacker drums 108 as shown in Fig. 11. This prevents the weight of the stack of plates from forcing the platform 117 downwardly so far that the plates 87 might be permitted to fall and overturn thus becoming inverted or lost from the stack. When the platform 117 reaches the bottom of the magazine PRM it engages a switch designated FSC in Fig. 1 and opens this switch to stop the operation of the machine in a manner which will be explained more fully hereinafter. This switch will be hereinafter termed the full stacker contacts and are similar in function to the contacts FPC which are opened when the card pocket 57 becomes full.

Movement of the plates 87 to the right in Figs. 8 and 9 is limited by the plate stops 130 which engage the right-hand corners of the plates to stop further movement thereof to the right and also guide the upper edges of the plates vertically in the stack. In order to prevent the plates 87 from being drawn back toward the plate magazine by friction or pushed back by the analyzing mechanism, there is provided a pair of detents 131 each pivoted at 132 to one of the plates 80, 81. These detents 131 are urged in a clockwise direction (Fig. 9), by springs 133 anchored to a spring anchoring bar 134 supported by the plates 80, 81, the bar 134 being slotted or suitably cut away to accommodate the detents 131. The detents 131 are formed with stop arms 131a which coact with one side of the bar 134 to limit clockwise rotation of the detent. As will be seen by reference to Fig. 13, the top edges of the plates 87 are rolled or beaded at 87a for the purpose of stiffening the upper edge of the plate. The plates 87 are placed in the magazine APH face up and, when a plate is ejected from the magazine by the pickers 91, the detents 131 snap over the bead 87a and prevent the plate from moving back toward the magazine when the pickers are retracted.

The plates 87 may take the form illustrated by Fig. 13 having removable insert plates 87b on which certain data is embossed and other data typewritten. Plates of this type are well known in the art. In the present case, it will be assumed that the plates are used for addressing checks each of which is to be perforated in accordance with certain data derived from the corresponding plate. This data is represented by means of representing devices which take the form of tabs 87c having the different shapes shown in Fig. 14 which designate the numerals 1 to 9, zero being represented by not placing a tab in a particular position.

As shown in Fig. 14, the tabs 87c have spring detent tongues 87d formed thereon which removably hold the tabs in place on the plate 87 in a well known way. There is provision in the plate shown in Fig. 13 for placing up to twelve tabs 87c on each plate to represent as many as twelve digits. In the present machine these tabs are analyzed when the plates 87 are ejected from the magazine APH and the machine is arranged so that the analyzing mechanism controls the punch selecting magnets PM to punch holes corresponding to the data represented by the tabs in the card corresponding to the plate carrying such tabs. Thus, the plate shown in Fig. 13 will be utilized in another machine to print the name, address, and amount on the illustrative card shown in Fig. 15. This card may be a tabulating bank check commonly employed in the systems of perforated record card accounting in current use.

The mechanism for analyzing the tabs 87c is shown in Figs. 8 to 12. This mechanism includes a bail 140 (Fig. 9) which is pivoted on a fulcrum wire 141 carried by the bar 83 and is urged in a clockwise direction by a spring 142 anchored to the bar 134. The cross bar of this bail is shaped as a comb having the slots 140a which guide a series of contact actuating levers designated 143, 144. These contact levers are pivoted on the fulcrum rod 141 and the bar 83 is transversely slotted to correspond with the slots 140a so as to space the levers 143, 144 apart. There is a pair of these levers for each of the tab positions on the plate 87, that is, there are 12 pairs of levers and the levers 144 are interspersed with the levers 143.

Figure 17A:
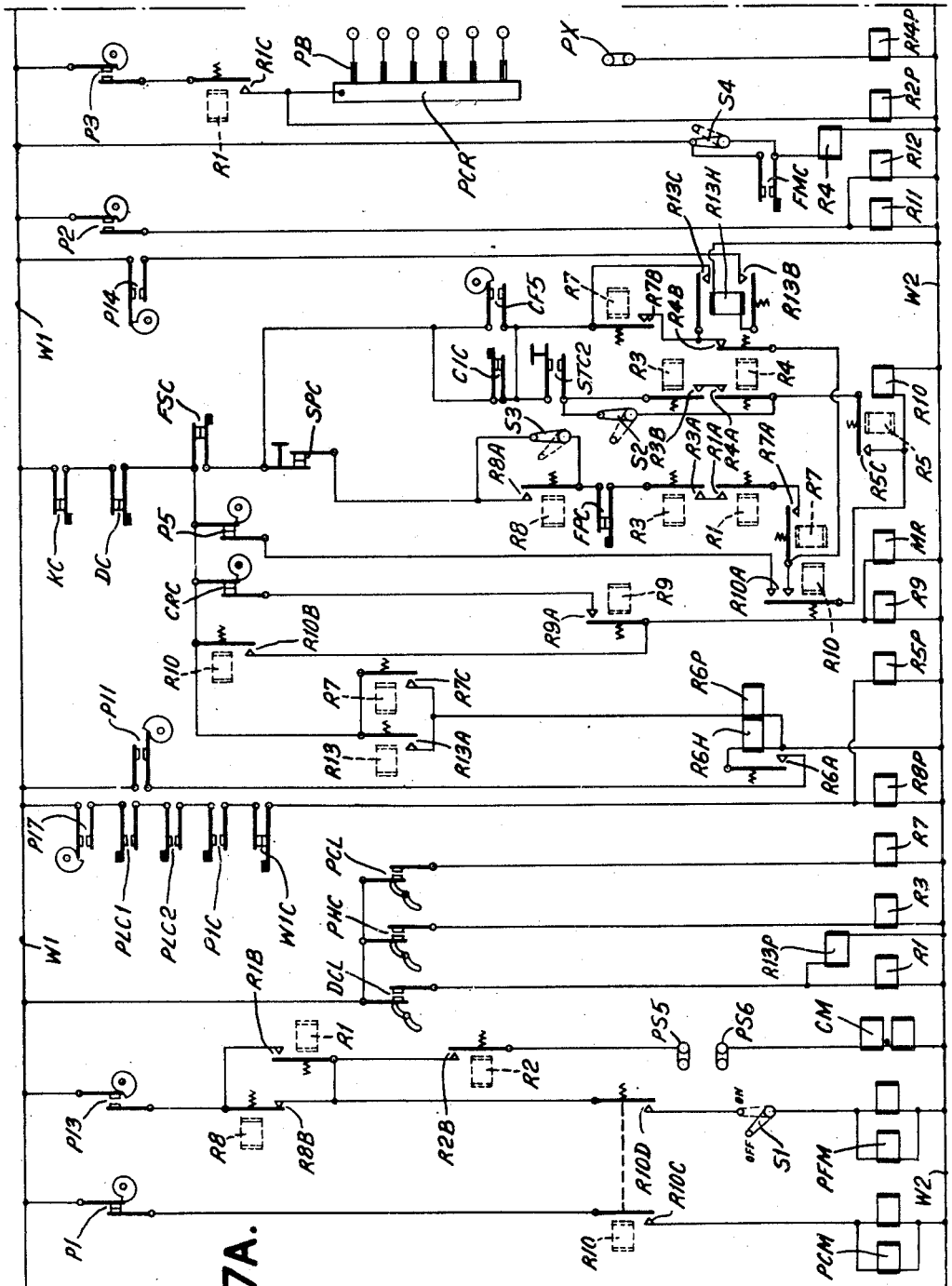
Figure 17B:
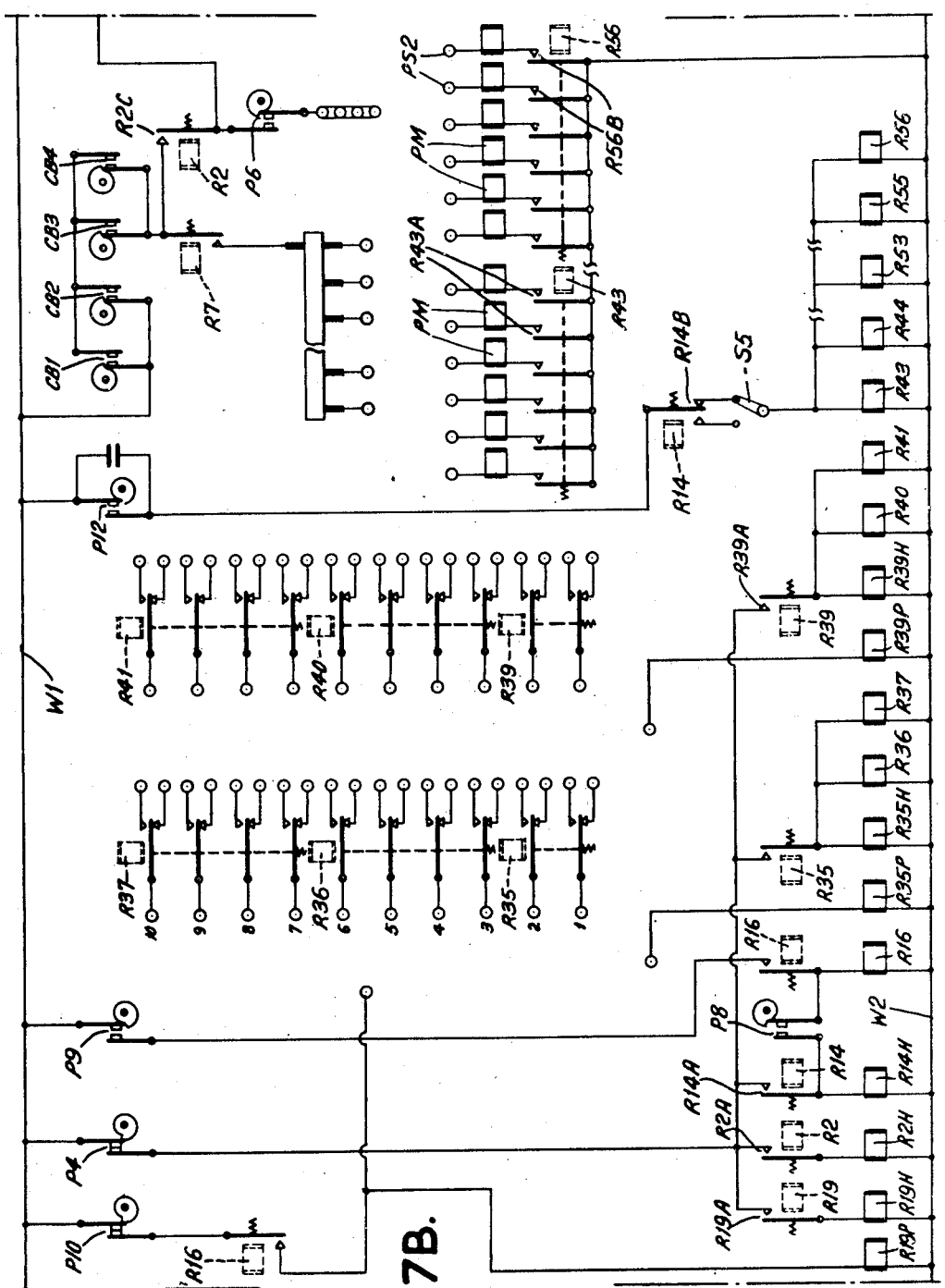
Figure 17D:
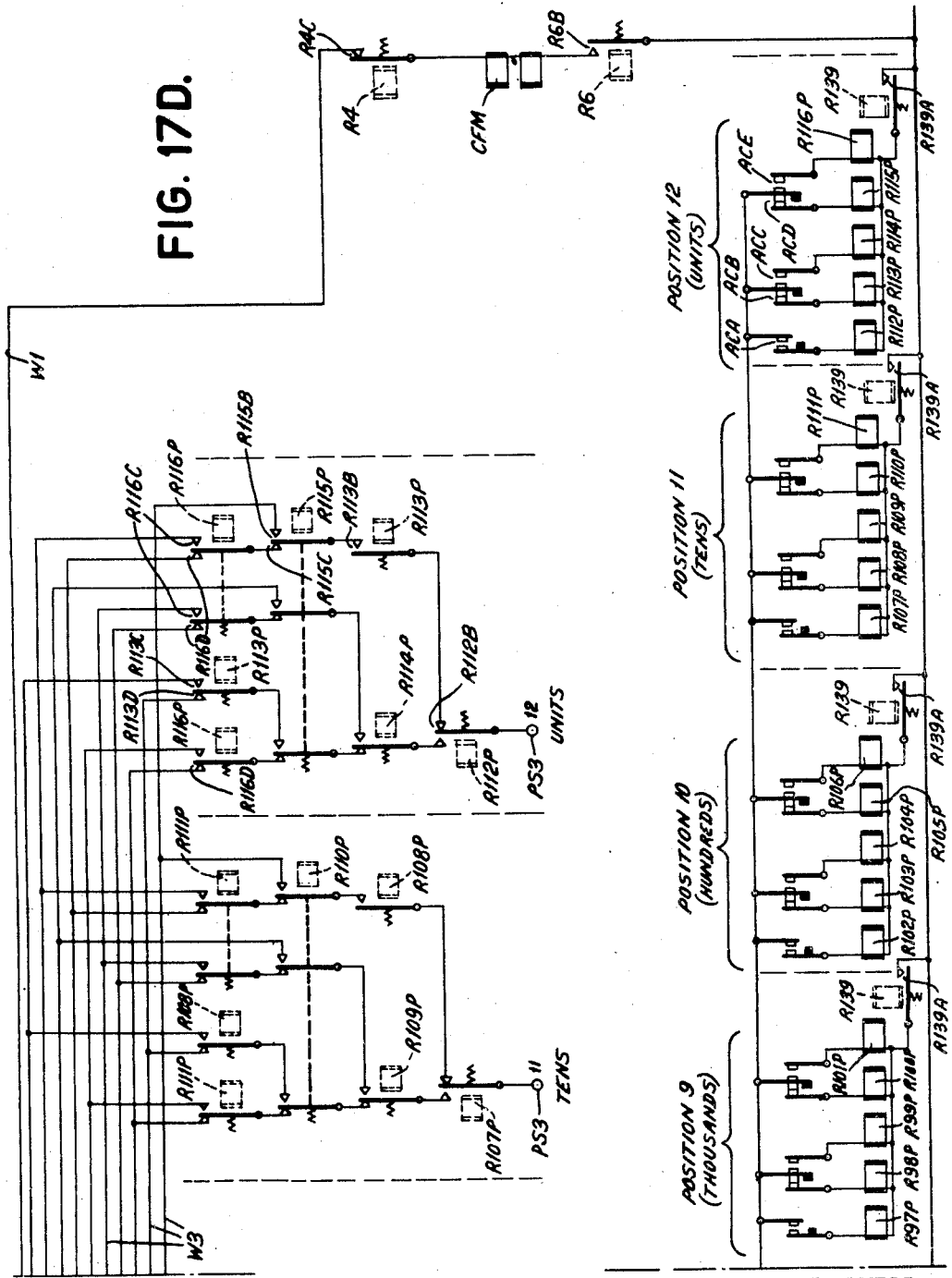

The levers 143, 144 are urged in a clockwise direction (Fig. 9) by springs 145 which are anchored to the bar 134 and each lever is provided with an insulating finger 143a, 144a positioned to actuate contact members designated ACA, ACB, ACC, ACD, and ACE in Figs. 9, 17C, and 17D. The lever 143 operates the contacts ACA to ACC while the levers 144 actuate the contacts ACD, ACE. Hereinafter these contacts will be termed the analyzer contacts and there is a complete set or group designated ACA to ACE for each position or order of the analyzing mechanism operated by a pair of the levers 143, 144. In Figs. 17C and 17D the analyzer contacts are shown in the position that they take when there is no tab inserted on the plate, corresponding to the digit 0.

The analyzer contacts are insulatably mounted on cross bars 146 secured to the edges of the plates 80, 81. In addition to the analyzer contacts, the analyzing mechanism is also provided with contacts called the plate lever contacts and designated PLC1, PLC2 (Figs. 8, 9A, and 17A) which may be similar to the contacts ACA, ACC, respectively, and are operated by levers 147, 148 (Figs. 8, 9, and 10) somewhat similar to the levers 143, 144.

The bail 140 is actuated by two cams 150 (Figs. 8, 9, and 12) secured to the shaft 103 through the cam follower links 151 which are slotted at their lower ends (Fig. 9) to embrace the cam 103 and have cam follower rollers 153a engaging the cams 150. The cam follower links 151 are connected to arms 140b formed in the bail 140 (Figs. 8, 9, and 9A).

When the shaft 103 rotates clockwise from the position of Figs. 7 and 9, the pickers 91 are first retracted sufficiently to enable the bottom plate in the magazine to drop in front of the pickers. With continued rotation of the shaft 103 clockwise, the pickers thrust the bottom plate to the right (Fig. 9) out of the magazine APH. During this period the bail 140 remains in the position of Fig. 9.

When the ejected plate 87 is almost completely ejected and is nearly in the position of the top plate at the right in Fig. 9, the cams 150 allow the links 151 to drop. Owing to the influence of the springs 142 and 145 the bail 140 and the levers 143, 144, 147, and 148 will be swung counterclockwise. If it should happen that any position on the plate lacks a tab 87c, the corresponding pair of levers 143, 144 will be rocked the maximum distance and will be stopped by the edge of the plate, as at the left in Fig. 14 to sense "0." Owing to the fact that the detents 131 have by this time snapped over the beaded portion 87c of the plate as in Fig. 9, the levers 143, 144 will be positively stopped. However, to insure full seating of the levers on the edge of the plate, provision is made for a slight overthrow in a clockwise direction (Fig. 9) of the bail 140 so that the levers 143, 144 will be held firmly against the edge of the plate by the tension of the springs 145, thus insuring a correct contact setting. This will cause the analyzer contacts ACA, ACC, ACE to open and analyzer contacts ACB, ACD, to close as shown in Figs. 17C and 17D. This represents the numeral 0, and, as will be seen later, will control a punch magnet PM to punch a zero hole in a card column corresponding to the plate position under consideration.

According to the shapes of the tabs 87c, the levers 143, 144 will be stopped in different intermediate positions to cause the analyzer contacts ACA to ACE to close and open in the different combinations shown in Fig. 14. In Fig. 14 only the closed contacts are noted and the others are assumed to be open for each tab combination shown. Thus when the plate tab is positioned for "5" the analyzer contacts ACA and ACE will be closed and the contacts ACB, ACC, and ACD opened.

The different combinations of contacts corresponding to different digits are shown in the following table:

*Table I*

| Numeral | Closed Contacts | Open Contacts |
|---|---|---|
| 0 | ACB, ACD | ACA, ACC, ACE |
| 1 | ACA, ACD | ACB, ACC, ACE |
| 2 | ACA | ACB, ACC, ACD, ACE |
| 3 | ACA, ACC | ACB, ACD, ACE |
| 4 | ACA, ACC, ACE | ACB, ACD |
| 5 | ACA, ACE | ACB, ACC, ACD |
| 6 | ACB | ACA, ACC, ACD, ACE |
| 7 | ACA, ACC, ACD | ACB, ACE |
| 8 | ACB, ACE | ACA, ACC, ACD |
| 9 | ACA, ACB, ACD | ACC, ACE |

The shaft 103 is driven by the main punch drive shaft 65 through a train of gearing and clutch which will now be described. Secured to the shaft 65 (Fig. 2) is a gear 160 which meshes with an idler gear 161. The gear 161 in turn meshes with a gear 163 fixed to the shaft 163 which is journaled in two plates 164 mounted on the base 30 and spaced apart by a block 165 (Fig. 12) and a cross bar 160. Also secured to the shaft 163 is a gear 167 (see Fig. 8 also) which meshes with a gear 168 secured to a short shaft 169 journaled in a bearing 170 carried by the left-hand plate 164 in Fig. 12. The gear 168 meshes with a gear 171 loose on the shaft 103. A one-revolution clutch of conventional form is provided for coupling the shaft 103 to the gear 107 and is designated 172 in Figs. 8 and 12. This clutch is controlled by a magnet PFM hereinafter termed the plate feed magnet. When this magnet is energized the clutch 172 is rendered effective in a well known way to couple gear 171 to shaft 103. The clutch 172 is of the single tooth or notch type so that the shaft 103 will always be picked up and driven in the correct timed relation to the operation of the punches and the feeding of the card to insure that the feed of the plates will be in synchronism with the feeding of the cards.

The counter is shown in Figs. 1, 2, 4, 5, and 6 and is substantially identical in construction with the one disclosed in Patent No. 1,976,617 but has been modified to enable the counter wheels to be set by hand. The counter is mounted in a main framework including the side plates 190 which are secured on top of a base plate 191 fastened to the base 30 and are joined together by several main cross bars designated 192. In addition the frames 190 are joined together by the cross bars 193 which support the electrical readout mechanism designated 194 and the cross bar 195 which supports the transfer mechanism.

Figure 4:
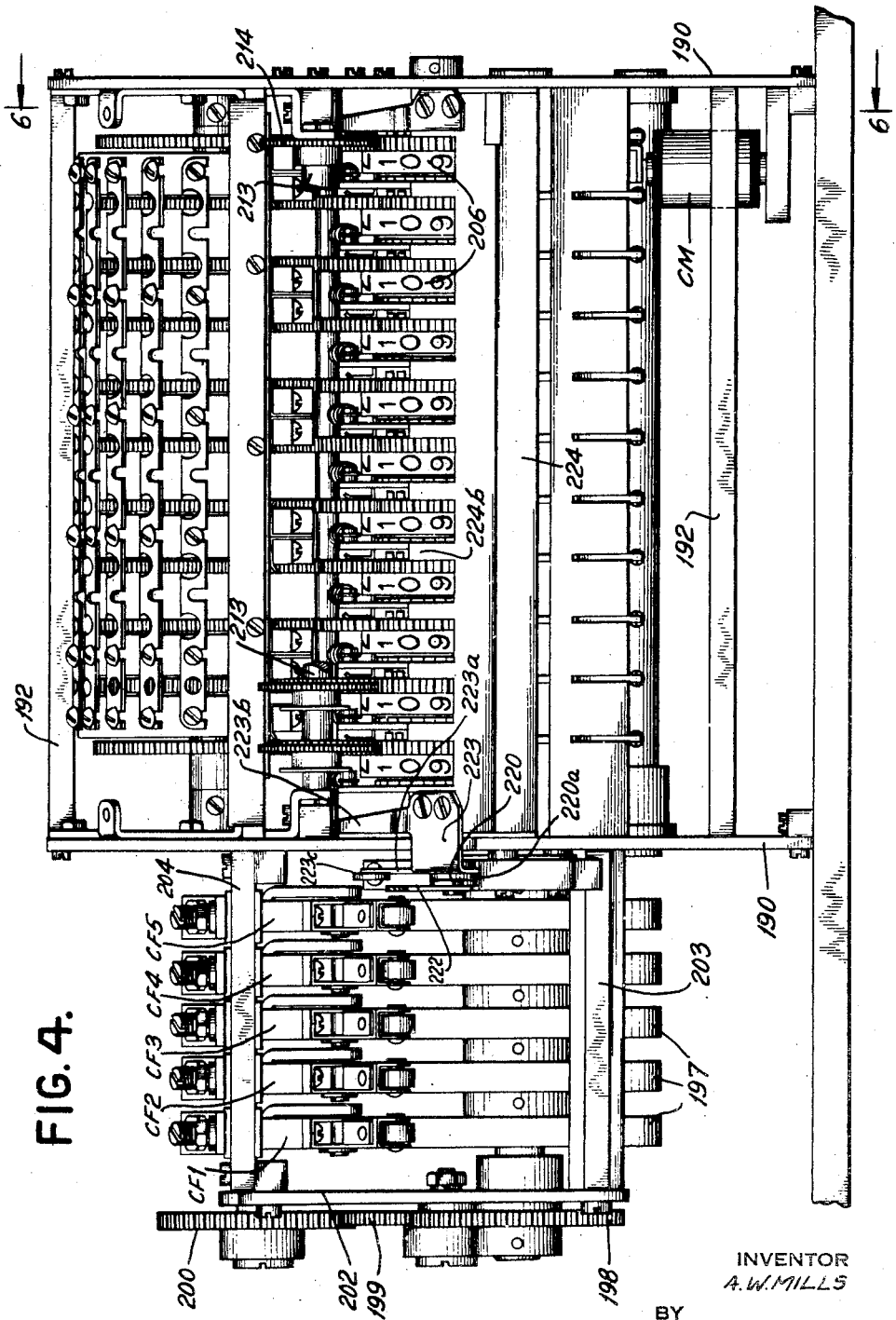
Fig. 4 is a front elevation of the counter.
Figure 5:
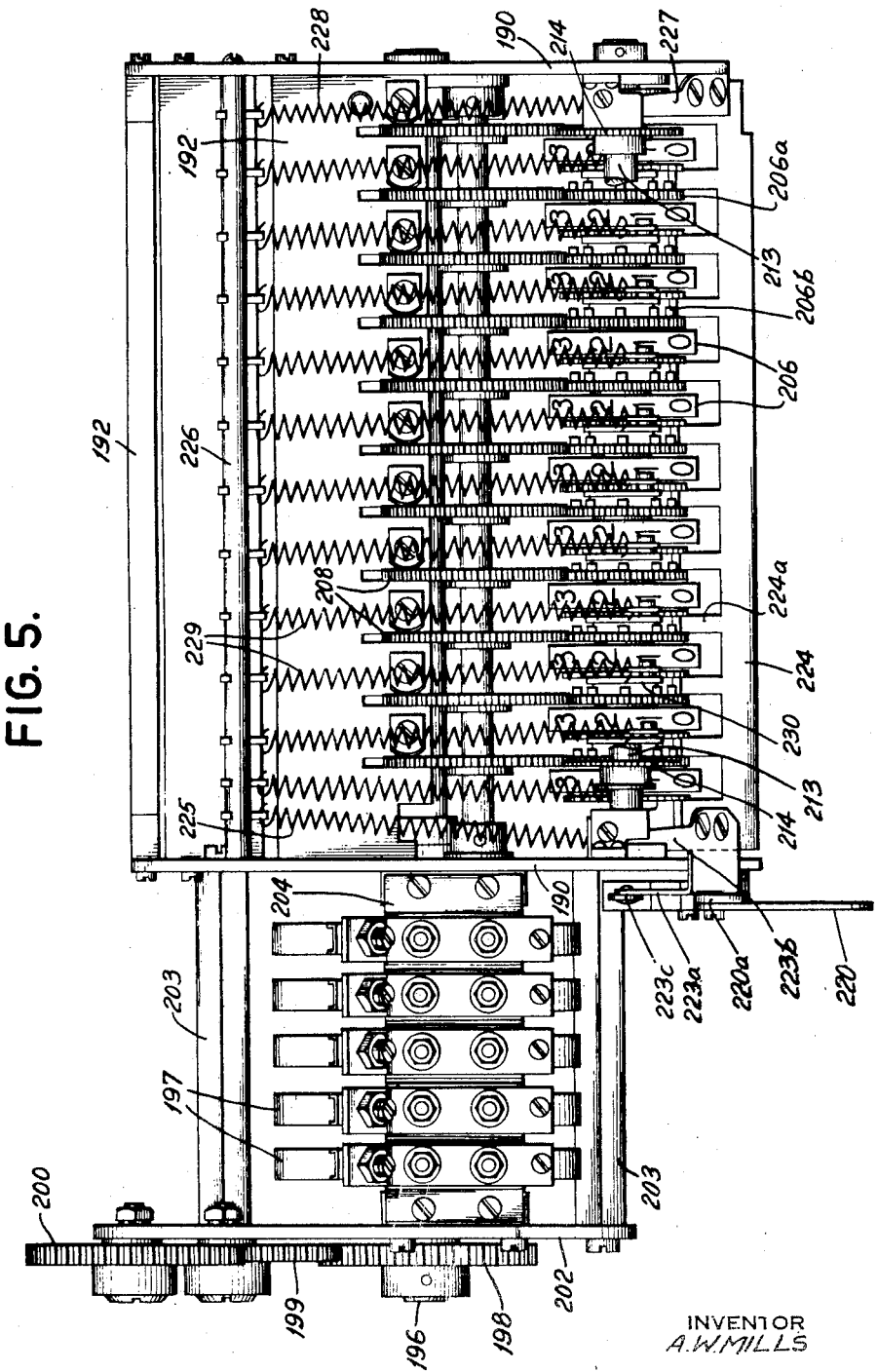
Fig. 5 is a plan view of the counter.

Journaled in the plates 190 is the main counter drive shaft 196 on which are mounted the timing cams 197 and the gear 198 (Figs. 4 and 5). The latter meshes with an idler gear 199 which in turn meshes with another idler gear 200 and the latter meshes with a gear 201 secured to the same shaft as the gear 70. Spaced from the left-hand plate 190 (Figs. 4 and 5) is a frame plate 202 which is mounted on plate 190 by the posts 203 and by a cross bar 204. The plate 202 carries suitable studs journaling the idler gears 199 and 200. Supported on the cross bar 204 are the contact devices designated CF1 to CF5. These contact devices are of conventional form and are actuated by the cams 197 in the timed relationship shown in Fig. 16. The gearing just described is such that the main counter shaft 196 is turned at the rate of one revolution per card cycle.

Figure 6:
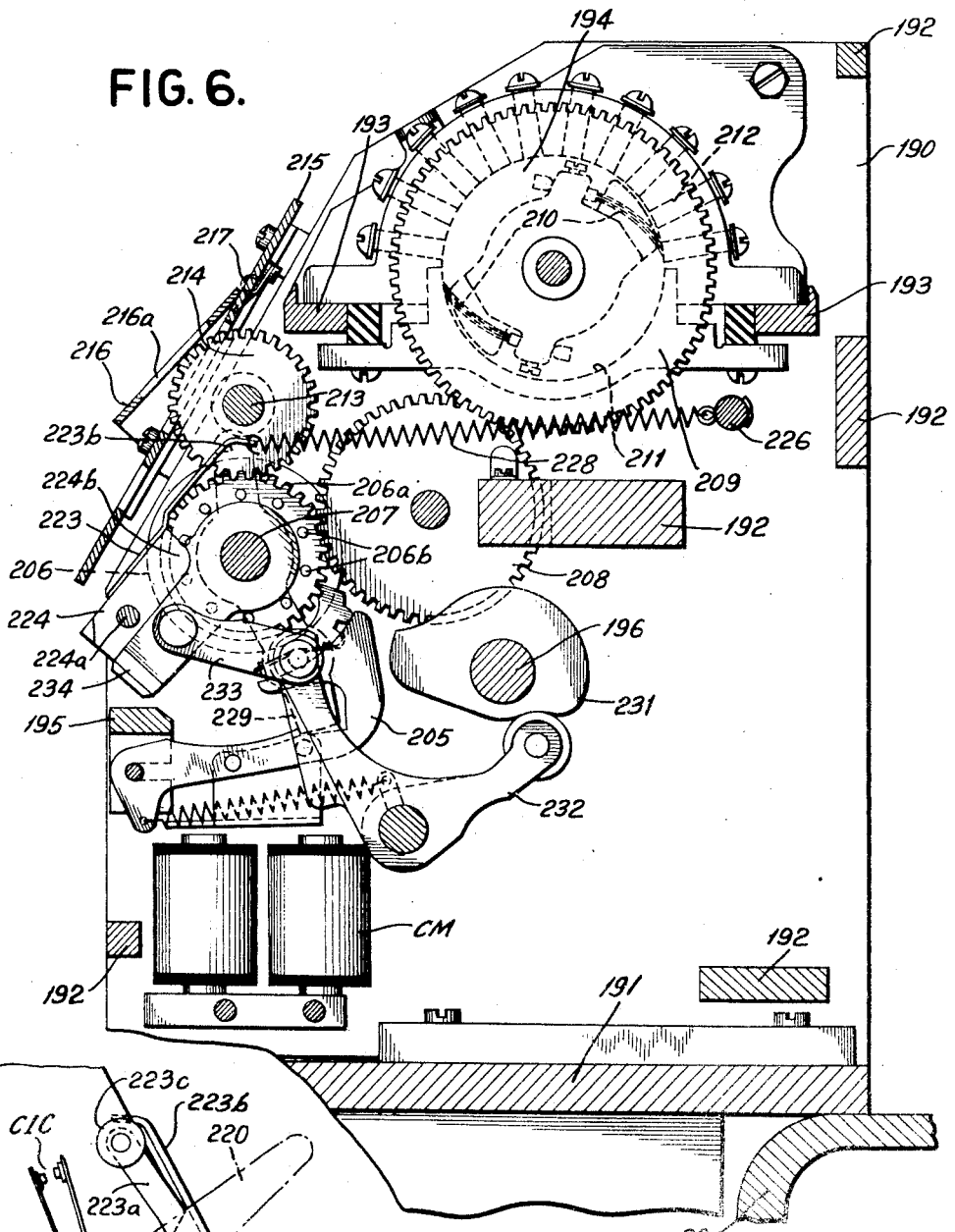
Fig. 6 is a vertical section on the line 6—6 in Fig. 4.

Since the counting and readout mechanism is old and well known and fully disclosed in Patent No. 1,976,617 it will be described very briefly herein. It will be sufficient to state that a counter magnet CM, as in the patent, operates a transfer lever 205 to cause the lowest order or units wheel to be advanced one unit for each energization of the magnet. In Figs. 4, 5, and 6, the counter wheels are designated 206 and are rotatable on the shaft 207 (Fig. 6) carried by the plates 190. Each counter wheel drives a readout commutator individual to that wheel through the idler gear 208 which meshes a gear 206a fixed to the counter wheel and with readout commutator gear 209. Attached to each gear 209 is a readout brush structure having the brushes 210 which cooperate with a common contact member 211 and the individual segments 212 which by their position represent the different digits of the series 0 to 9 inclusive. Thus, when the counter wheel 206 displays the numeral 6, for example, one of the brushes 210 will be resting upon the "6" segment 212.

Provision is made in the present case for manually setting the counter wheels 206 to display any desired number within the capacity of the counter before starting operation of the machine. For this purpose there is provided a shaft 213 (Figs. 4, 5, and 6) mounted in the plates 190 and carrying the gears 214 which mesh with counter wheel gears 206a. The gears 214 extend through slots in a guard plate 215 suitably mounted on the plates 190 and provide a means of turning the individual counter wheels 206 by hand.

It is undesirable that the counter wheels be turned while the machine is in operation. For this reason there is provided mechanism which compels the operator to stop the machine before changing the set-up of the counter wheels. This mechanism includes a shield 216 (Figs. 1, 2, and 6) which is hinged at 217 to the plate 215 and is provided with slots 216a aligned with the gears 214. Normally the shield 216 occupies the position shown in Figs. 1 and 6 in which it is impossible to reach the gears 214 with the fingers. Provision is made for depressing the shield 216 by hand to enable the gears 214 to be turned manually.

The shield 216 is controlled by means of a manual lever 220 (Figs. 1, 2, 4, and 5) which is pivoted at 221 (Fig. 2) on the plate 190. This lever 220 has a pin and slot connection to a link 222 which in turn is pivoted at 216b to an ear formed in shield 216 located a little above and to the left (Fig. 2) of the axis of the hinges 217. When the lever 220 is in the position of Fig. 2, the link 222 holds the shield 216 in the raised position best shown in Fig. 6 in which the gears 214 cannot be reached with the fingers. When the lever 220 is raised manually, that is, rocked counterclockwise in Fig. 2, the link 222 is allowed to rise in consequence of the weight of the plate 216, which is allowed to drop to a position in contact with the surface of the plate 215.

The hub 220a of the lever 220 is formed with a flat against which a spring 220b (Fig. 6A) holds lever 220 in a horizontal position. Engaging this flat is an arm 223a of a member 223 secured to a comb 224 which is pivoted at 224a (Figs. 6 and 6A) between the plates 190. The teeth 224b of the comb 224 project between the counter wheels 206 and engage two successive pins 206b of a series of ten projecting from the sides of the gears 206a, thereby holding said gears and consequently the counter wheels 206 in alignment. The member 223 is provided with an arm 223b to which is anchored a spring 225 the other end of which is anchored to a cross rod 226 which spring normally holds the teeth 224a in engagement with the pins 206b as shown in Fig. 6 to thereby prevent rotation of the counter wheels 206. There is provided a similar member 227 and spring 228 at the opposite end of the comb 224. The cross rod 226 also serves to anchor the springs 229 (Fig. 5) which operate the usual carry levers 230 of the counter.

When the lever 220 is operated to lower the plate 216, the flat on the hub 220a moves away from the arm 223a and causes it to be rocked in a clockwise direction (Fig. 2) thereby rocking the comb 224 in the same direction or counterclockwise with reference to Fig. 6. This releases the teeth 224b from the pins 206b and permits the counter wheels 206 to be turned freely by hand. The arm 223a is provided with an insulating washer 223c which coacts with a pair of contacts CIC. The contacts CIC are spring urged apart but, with the lever 220 in the position of Fig. 2, they are kept closed. These contacts will be known as the counter interlock contacts and their function is to interrupt the main motor control circuit to prevent starting the motor while the counter wheels are being set by hand.

In the present machine, there is no necessity for entering multi-digit amounts in the counter during the course of the operation of the machine as, in the present case, the accumulator functions as a simple consecutive counter. Accordingly, the usual accumulator driving gears, clutches, and entry controlling magnets have been omitted. The counter is, however, provided with the usual cam 231 (Fig. 6) secured to the shaft 196 for operating the carry levers 229. This cam actuates a cam follower lever 232 one arm of which has a link connection 233 to the usual carry lever bail 234 which operates the carry levers. When the magnet CM is energized it releases the carry lever 229 for the units order wheel and thereafter the bail 234 is actuated by the cam 231 to enter a unit in the units wheel as in Patent No. 1,976,617. The bail 234 also operates the carry levers for the remaining wheels in a well known way whenever a transfer from a lower order wheel to a higher order wheel is necessary. Since the counter wheels will be set manually to a new number prior to beginning each run of the machine, the usual means for restoring the counter wheels to zero is not provided.

A number of safety contacts are provided to insure proper operation or prevent misoperation of the machine under conditions which may arise. It sometimes happens that the addressing plates are slightly bent due to their having been dropped on the floor or handled too roughly. A plate may be so badly bent that it may fail to eject from the address plate hopper APH and block the pickers 91. This allows the spring 104 (Fig. 7) to stretch and enables the pin 100d to travel toward the open end of the slot 101a without damage to the machine. However, in the meantime, a card will have been fed with the result that the machine will get out of time and, in any case, no further plates can be fed until the bent one is removed. In order to prevent the operation of the machine when a plate fails to eject from the magazine, there is provided the picker interlock contacts PIC (Figs. 7 and 8) which are actuated by an arm 94a secured to the shaft 94. This arm is positioned to close the contacts PIC just before the end of the movement of the pickers 91 to the right and at about the time the plate lever contacts PLC1, PLC2 should be closed. It will be noted in Fig. 17A that the contacts PIC, PLC1, PLC2 are in series, therefore, if all are closed, it signifies that a plate has been fed from the magazine. However, if a plate has not been fed, all three of these contacts will remain open and, as will be seen later, will stop the machine before the card corresponding to the plate which fails to eject, has been fed past the die. This gives the operator a chance to remove the plate and repair it or substitute a new one without causing a hiatus in the operation of the machine.

Another set of contacts is rendered operative to stop the machine in the event the operator fails to place the follower plate or weight 88 in the machine. Near the end of the run on a stack of plates, when only a few plates remain in the magazine APH, there may be insufficient weight on the bottom plate 87 to enable it to be properly ejected from the magazine. As an example, a plate 87 might stick slightly in the guides 86 and only partly drop down to the ejecting position, or the plate may fail to drop altogether, causing the pickers 91 to jam or miss the plate. If the plate drops down far enough to be picked up by the pickers 91, it may be jammed due to its leading edge failing to clear the throat blocks 96, in which event, of course, the contacts PIC will be effective to stop the machine. If the pickers miss the plate, then the contacts PLC1, PLC2 will stop the machine so that no harm can result. However, all of this trouble is due merely to failure to place the follower plate 88 on top of the plates and causes unnecessary delay in the operation of the machine which can be prevented merely by putting the weight in place.

In Figs. 7 and 7A there is shown a contact mechanism which is controlled by the plates 87 and the follower weight 88 in such a fashion as to stop the operation of the machine while a few of the plates remain in the hopper APH in the event that the follower plate is not placed on top of the stack of plates. The side frame plate 80 is provided with an opening in which is located a contact control mechanism which includes a bracket 240 secured to the plate 80. Pivoted at 240a on bracket 240 is a lever 241 urged in a clockwise direction (Fig. 7A) by a spring 242 anchored to one end of the lever 241 and to an ear forming part of the bracket 240. The lever 241 is formed with a cam projection 241a designed to engage the ends of the plates 87 in the magazine and also has a projection 241b cooperating with an insulating plate 243 carried by one of a pair of contact members bearing the contacts WIC, hereinafter to be known as the weight interlock contacts. Normally the contacts WIC are spring-biased to a closed position with projection 241 clear of the plate 243. When the magazine is filled with plates, the latter rock lever 241 to the position shown in Fig. 7A permitting the contacts WIC to close. The cam projection 241a is so disposed that, when only four plates 87 remain in the magazine, the topmost plate will be clear of the cam surface allowing the spring 242 to rock the lever 241 in a clockwise direction thereby opening the contacts WIC. The follower plate 88 is thick enough, however, so that, if it has been placed on top of the stack its edge will engage the cam surface 241a when the fifth plate from the end is ejected from the magazine and hold the lever 241 in the position of Fig. 7A, thereby preventing the contacts WIC from opening while the last four plates are fed from the machine.

If the operator fails to place the follower weight 88 on the stack of plates, contacts WIC open and stop the feeding of both plates and cards in a manner to be made clear hereinafter, and without producing any gaps in the feeding of either plates or cards. The operator then places the weight 88 on top of the last four plates and restarts the machine which then resumes operation as if no interruption had occurred.

*Circuit diagram*

Figs. 17A to 17D, when placed end-to-end in alphabetical order, comprise a wiring diagram of the machine in which duplications of identical electrical elements have been avoided as far as possible, in order to reduce the size of the diagram. Examples are the card sensing brushes, of which only a few are shown, and the tab analyzing circuits, of which only six complete positions are shown. So far as possible, all control magnets, contacts, relays, and timing contacts have been designated by letter combinations derived by taking the initial letters of the words in the name. Thus the plate lever contacts are designated PLC1, PLC2, the weight interlock contacts WIC, and so forth. All relays are designated R plus a number. Since many of the relays are of the dual coil type, having two coils on a common core, both of which actuate a single group or pair of contacts, the coils are further designated P and H to signifying in most cases, "pick-up" and "hold." Thus, R5P and R5H designate the coils of a dual coil relay R5P—R5H of which R5P is the "pick-up" or initially energized coil, and R5H the holding coil. These coils actuate contacts R5A, R5B, R5C. Other relays are similarly designated, the letters A, B, C, D, being used to designate the contacts. In each case the pick-up coil P is shown in dotted lines adjacent the contacts operated thereby wherever the latter appear in the wiring diagram. With one or two exceptions, the coils of the relays are numbered in order from left to right in Figs. 17A to 17D. The relays R67P—R67H to R81P—R81H, associated with the third to eighth tab analyzing positions or orders, and their contacts have been omitted from the drawing as they are duplications of the six orders shown.

While the positions or orders of the tab analyzing mechanisms are shown arranged in Figs. 17C and 17D in the same relative denominational positions as the numbers to which they correspond would ordinarily be written, it will be understood that the orders are independent in respect to the punching of the cards, as any order can be plugged to any punch magnet PM. Thus, the numbers could be scrambled or punched in scattered columns by criss-cross plugging and unscrambled by similar criss-cross plugging when the cards are run through some other record controlled machine, such as a record controlled accounting machine.

With the foregoing kept in mind, the operation of the machine will be easily understood from the description which follows:

*Operation of the machine*

In order to explain the operation of the machine, it will be assumed that a set of cards, of which the one shown in Fig. 15 is the first, and a corresponding set of address plates 87 are to be run through the machine and the cards punched according to the significance of the tabs 87c, the first plate being the one shown in Fig. 13 which matches the card shown in Fig. 15. The switches S1, S2, S3, S4, S6, and S7 will be thrown to the dotted line positions to condition the machine for feeding address plates. The switch S5 may be left in the position shown in Fig. 17B.

Figure 3:
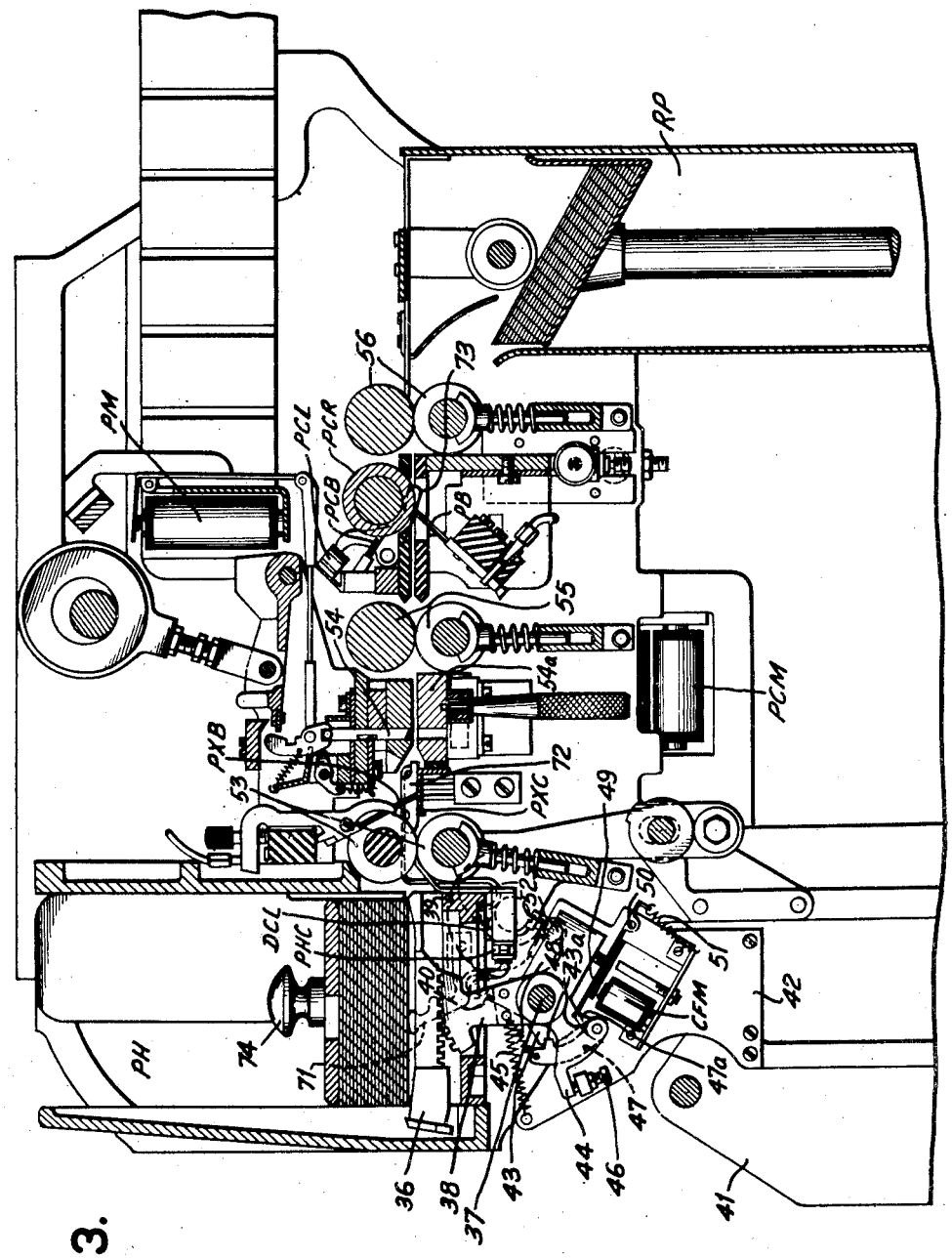
Fig. 3 is a vertical longitudinal section showing the card feeding and punching mechanisms.

The stack of cards will be placed in the punch hopper PH face down with the "9" positions at the left in Fig. 3 so that the card shown in Fig. 15 will be at the bottom of the stack and will be the first one ejected from the hopper. The plates 87 will be placed in the plate magazine APH face up with the tabs 87c at the right (Fig. 9) with the plates arranged in such order that the first plate, shown in Fig. 13, is at the bottom. The machine will be plugged as shown in Fig. 18 in which the plug wires are designated PW1 to PW4. The check number on the first card (Fig. 15) will be set up in the counter after lifting the lever 220 to lower the plate 216 and permit turning the first five wheels from the right (Fig. 4) to set up the number 13216 by manually rotating the gears 214.

With the plugboard set-up illustrated by Fig. 18, the date will be automatically punched in columns 64 to 70 of each card as shown in Fig. 15, the check number in columns 71 to 75 and the amount in columns 76 to 80. The date will be automatically punched under control of the gang punch emitter E in a well known way through the plugging indicated by the plug wires PW1. The check number will automatically be punched under control of the counter 35 through the plug wires PW3, while the amount designated by the tabs 87c will be punched under control of the plate tab analyzing mechanism by way of the plug wires PW2.

When the stack of cards is placed in the punch hopper PH, the contacts PHC (Fig. 17A) are closed thereby energizing the relay R3 which closes its contacts R3B to partly condition the main starting circuit through contacts STC2 for starting the machine in operation. The placing of the plates 87 in the plate magazine APH also closes the contacts FMC thereby energizing relay R4 which closes its contacts R4A to further condition the main starting circuit for starting the machine. The light L is already lighted over a circuit from line wire W1 (Fig. 17C), contacts P18, R5B, and the light L, to line wire W2.

The plate feed starting key is now depressed closing the contacts STC1 (Fig. 17C). This causes the relay coil R5H to be energized over a circuit from line wire W1, contacts P18, contacts STC1, contacts R3C (now closed), switch S6, and relay coil R5H, to line wire W2. The relay R5P—R5H also closes its contacts R5A to establish a holding circuit around contacts STC1 for the coil R5H to permit the release of the starting key and allow contacts STC1 to open. The relay R5P also closes contacts R5C (Fig. 17A) to further condition the main starting circuit. This circuit may now be closed by depressing the main starting key and closing the contacts STC2 and is traced as follows: line wire W1, contacts KC, DC, FSC, CIC, STC2, R3B, R4A, R5C, and relay R10, to line wire W2.

Relay R10 closes its contacts R10A thereby establishing a temporary holding circuit for the relay R10 through the contacts R10A and P5, permitting the starting key to be released and contacts STC2 to open. Contacts R10B also are closed and establish a circuit from line wire W1 through contacts KC, DC, and R10B, and the relays R9 and MR in parallel, to line wire W2. The relay MR is the power relay which closes the power circuit to the motor M in a well known way thereby starting the motor.

Relay R10 also closes contacts R10C (Fig. 17A) to enable the punch clutch magnet PCM to be impulsed through the contacts P1. As a result, the punch card feeding mechanism starts and the first card will be ejected from the punch hopper PH, thereby closing the contacts DCL just before the ejected card reaches the punches 54.

The relay R10 also closes contacts R10D, enabling the plate feed magnet PFM to be energized early in the first card feeding cycle over a circuit from line wire W1 (Fig. 17A), through contacts P13 (which close almost immediately, Fig. 16); contacts R8B, R10D; switch S1, and magnet PFM, to line wire W2.

As a result of the energizing of the magnet PFM, the plate feed mechanism ejects the first plate from the magazine during the first card feeding cycle, thereby enabling the contacts PLC1, PLC2 to remain closed when the bail 140 (Fig. 9A) is oscillated. This permits establishing of a holding circuit for the relay coil R5P (Fig. 17A) from line wire W1, through the contacts P17, PLC1, PLC2, P1C, W1C, and the relay coil R5P, to line wire W2. At the same time, relay coil R8P is energized in parallel with coil R5P, thereby closing the contacts R8A and opening the contacts R8B. The operation of the bail 140 during the first card cycle also causes the levers 143, 144 to be stopped selectively under control of the tabs 87c on the first plate 87.

On account of the fact that the contacts R7A are still open at the end of the first card cycle, it is necessary to hold the contacts STC2 closed long enough to start the next card cycle during which the second card and the second plate are fed. The closing of contacts PCL by the first card at the end of the second card cycle energizes relay R7 thereby closing contacts R7A to complete a holding circuit for the relay R10 which circuit is maintained (except as noted below) as long as both plates and cards continue to feed.

Contacts PLC1, PLC2 remain closed after the first cycle except for a brief period in the next cycle bridged by contacts P17 (Fig. 16) during which period the contacts PLC1, PLC2 are reclosed by the next plate. Except during this brief interval, contacts P18 remain closed to keep coil R5H energized until the reclosure of contacts PLC1, PLC2 reenergizes coil R5P. Thus, one or the other of the coils R5P, R5H is always energized as long as plates continue to feed, keeping light L extinguished and keeping relay R8 energized except for the brief period mentioned. Contacts P5 keep relay R10 energized during the brief period relay R8 is deenergized and contacts R8A open and prevent stoppage of card and plate feeding, provided both cards and plates continue to feed.

If cards fail to feed at any time due to a jam, exhaustion of the hopper PH, or skipping of the picker 36; the plates fail to feed; pocket RP or magazine PRM becomes too full, or the stop key is operated to open contacts SPC, one or more of the relays R1, R3, R7, R8 will be deenergized or one of contacts FSC, FMC will open, thereby opening the circuit through contacts R1A, R3A, R7A, R8A, SPC, FSC, FMC, permitting deenergization of relay R10 and ultimately causing complete stoppage of the machine in manners explained in greater detail hereinafter. Relay R5P—R5H will also be deenergized causing contacts R5B to close and excite lamp L.

Relay R13P (Fig. 17A) is energized in parallel with relay R1 during the first cycle, closing contacts R13A to energize relay coil R6P and the latter closes contacts R6A to set up a holding circuit for coil R6H through contacts P11. Relay coil R6P also will be held through contacts R13A until the last card is conveyed to the pocket RP.

When the last card is ejected from hopper PH, the last plate is ejected from the plate hopper APH, allowing contacts FMC to open, deenergizing relay coil R4, and permitting contacts R4B to close. Since relays R7, R13P—R13H are still energized at this time, relay R10 will be kept energized through contacts R7B, R13C until the last plate and last card have been stacked. Relay R10 will be deenergized at the end of the last cycle, in which the last card is stacked, and, since relays R1, R3, R7, R13 have all been deenergized by this time, the machine will stop. Relay coil R5P is deenergized during the cycle in which the last card passes punches 54 causing contacts R5B to close. This enables contacts P18 to light the lamp L which remains lighted while the machine is stopped since contacts P18 are closed at the stopping position.

Near the end of the first card cycle, the closing of the contacts DCL will energize relay R1 which closes the contacts R1B to counteract the opening of contacts R8B (Fig. 17A) of relay R8 so far as the circuit for plate feed magnet PFM is concerned. Contacts R1A and R8A are also closed to condition the main running circuit which extends through the contacts R7A of relay R7, the contacts R3A having already been closed by the energization of relay R3 when the cards are placed in the punch hopper PH. Contacts R1C also close and enable relay coil R2P to be energized through contacts P3 at the end of the first card feeding cycle. Contacts P4 (Fig. 17B) close while the contacts R2A are still closed and enable a holding circuit to be established for the holding coil R2H through the contacts R2A (Fig. 17B). Thus, relay R2 will be kept energized throughout substantially the entire part of the second and following cycles.

The contacts R2B close and enable contacts P13 to energize the counter magnet CM at the beginning of the second cycle. The energization of the relay R2P—R2H comes too late in the first cycle to enable a unit to be added in the counter whereby the counter remains unchanged at the initially set number until after such number has been read out and the first card punched during the second cycle. The magnet CM is energized at the beginning of the second cycle but merely releases the units order carry lever 229 and the operation of bail 234 by cam 231 causes a unit to be added in the units order of the counter in a well known way at the end of the second cycle. Thus, the counter is conditioned to cause the second card to be numbered a unit higher than the first card.

Near the end of the first cycle, contacts CF1, CF2 close (Fig. 16) and energize relays R138, R139 which close contacts R138A, R139A to enable circuits to be established through relays R57P to R116P selectively and combinationally according to the number and numerical significance of the tabs on the first plate.

Early in the second cycle the leading edge of the first card passes underneath the punches 54 and, during this cycle, the tab analyzing circuits set up during the first cycle come into play to cause the amount designated by the tabs in the first plate to be automatically punched in the first card.

The manner in which the foregoing operations are accomplished may be illustrated by selecting the first tab on the right in Fig. 13 representing the numeral 8. As will be seen by reference to Table I and Fig. 14, this tab permits the lever 143 in the units position (position 12, Figs. 17D and 18) to move the maximum extent during the first card cycle until the lever is stopped by the upper edge of the address plate, whereas the associated lever 144 will not be permitted to move at all, thereby holding the associated contacts ACE closed, closing contacts ACB, and opening contacts ACA, ACC and ACD. Contacts ACB and ACE being closed, the relay coils R113P, R116P will be energized at "13" in the first cycle, when contacts CF1, CF2 close, over a circuit as follows: line wire W1, switch S7 (Fig. 17C), contacts CF1, CF2, ACB, ACE (Fig. 17D); the coils R113P, R116P; and contacts R139A, to line wire W2. The energization of these coils establishes a holding circuit in each case from switch S7 through the contacts CF3, R116A (Fig. 17C), and R113A (not shown) and the coils R116H, R113H (not shown); to the line wire W2. The energization of the coils R113P, R116P closes contacts R113B, R116C (Fig. 17D).

In a similar fashion, certain of the relay coils R97P to R111P will be energized according to the tabs 87c in positions 9, 10, and 11 including relay coils R93P, R95P due to the lack of a tab for position 8 of the plate 87 in Fig. 13. Thus, at the end of the first cycle, the holding coils R57H to R116H of the relays R57P—R57H to R116P—R116H will have been energized according to the following:

*Table II*

| Position | Numeral | Contacts | Relays |
|---|---|---|---|
| 8 | 0 | ACB, ACD | R93H, R95H |
| 9 | 5 | ACA, ACE | R97H, R101H |
| 10 | 6 | ACB | R103H |
| 11 | 3 | ACA, ACC | R107H, R109H |
| 12 | 8 | ACB, ACE | R113H, R116H |

The effect of the contacts of these relays is to connect the "0," "5," "6," "3," and "8" wires W3 from emitter E (Figs. 17C and 17D) to the plug sockets PS3 for positions 8 to 12 inclusive, in the order named.

During the second cycle, when the first card passes the punches 54, the emitter E emits ten successive impulses through the closed contacts of the relays in the last column of Table II. When the emitter brush 75 reaches the "8" segment, for example, the punches 54 will register with the "8" positions on the card and an impulse will be emitted from line wire W1 through the contacts CB1 to CB4 (Fig. 17B), contacts R2C, the emitter brush 75 (Fig. 17C), the "8" segment 76 and "8" wire W3, the right-hand contacts R116C (Fig. 17D), contacts R115C, R113B, and R112B, to the plug socket PS3; thence through a plug wire PW2 to the plug socket PS2 for column 80 (Figs. 17B and 18) the punch magnet PM for card column 80, and contacts R56A to line wire W2. The relays R43 to R56 are energized once per cycle through the contacts P12 (see Fig. 16) and the contacts R14B. This results in punching an "8" in column 80 of the first card. In a similar fashion, the digits 0, 5, 6, and 3 will be punched in columns 76 to 79 of the card.

During the passage of the first card past the punches, the gang punch emitter E also will be effective to punch the date in a well known way through the plug wires PW1. Finally, the check number 13261 will be punched automatically in a well known way through the emitter E and the counter readout contacts which are connected to the punch magnets PM for columns 71 to 75 by plug wires PW3 (Fig. 18).

Addressing plates are usually handled in single drawer lots on account of their weight and bulk, each drawer holding about 180 plates, whereas the cards are handled in lots of about 800, the usual capacity of the card hopper PH. Since the plate drawers contain enough plates for only a very brief run of the machine, the operator must devote a relatively large amount of time to replenishing the plates. The machine is shut down while the plates are replenished and, if the operator has to replenish the card hopper at the same time and take the care necessary to limit the number of cards per run to the plate capacity, much machine time will be lost. On the other hand, if 800 cards are placed in the card hopper PH and a drawer full of plates is placed in hopper APH, the latter will become exhausted long before hopper PH. The machine would stop at the end of the cycle in which the last plate is ejected from analyzing position and the corresponding card is punched. Also during this cycle, another card would be ejected from hopper PH, if no means were provided to prevent it, but no plate would be fed, since the corresponding plate is in the next drawer. If now the plates from this drawer were placed in hopper APH and the machine restarted, the first plate would be at least one cycle behind the corresponding card and all of the remaining plates and cards will remain out of step. This error would accumulate at the rate of at least one cycle per drawer of plates and, by the time the hopper PH became exhausted, the plate would be at least four cycles behind the cards.

In order to prevent the odd-cycle error just mentioned and to reduce the time necessary to replenish the machine with cards and plates and restart the machine, means is provided to stop the ejection of cards from hopper PH and at the same time maintain the feeding of cards and plates long enough to stack the last card and the corresponding plate. This means includes the card feed magnet CFM and the relay R4 which, it will be recalled, was energized when addressing plates were placed in the hopper APH. In order to make clear how magnet CFM functions, it will be convenient, for the purposes of description, to consider in order of occurrence the last four cycles of operation of the machine. The functions of these cycles are as follows:

1. Eject the last card and last plate from hoppers PH and APH, respectively, feeding the last card to the die 54a and the last plate to analyzing position. The tabs are analyzed during this cycle and relays R57H to R116H energized according to the values of the tabs 87c.

2. Stack the last plate and punch the last card according to the values stored by relays R57H to R116H as represented by the condition of their contacts.

3. Feed the last card past punch brushes PB.

4. Stack the last card and stop the machine.

Cycle I

The full magazine contacts FMC open near the end of this cycle when the trailing edge of the last plate leaves hopper APH, deenergizing relay R4 which closes contacts R4B, R4C, and opens contacts R4A. Since contacts R4B are now closed, relay R10 is not deenergized and the feeding of the last card is continued for another cycle by a holding circuit for relay R10 from line wire W1, through contacts KC, DC, FSC, CIC, R7B, R13C, R4B, R10A, and coil R10, to line wire W2. The last plate is analyzed preparatory to punching the last card in the second cycle. Since relay R6 is still energized holding contacts R6B closed, magnet CFM is energized when contacts R4C close thereby preventing the ejection of cards from hopper PH during the remaining closing cycles.

Cycle II

The last card is fed past the punches PB and punched under control of relays R57H—R57P to R116H—R116P. The last plate is stacked, opening contacts PLC1, PLC2. Contacts DCL open near the end of the cycle, deenergizing relay R1 and coil R13P, permitting contacts R1A to open. Since contacts P11, P14 are closed at this time, relay R6 and coil R13H remain energized, and relay R10 is held long enough to start another cycle. Relay R5P—R5H is deenergized closing contacts R5B to light lamp L.

Cycle III

The last card is fed past brushes PB but, owing to the shape of the lever which actuates the contacts PCL, these contacts do not actually open until after contacts P5 have reclosed or, in the case of a square corner card, early in the fourth cycle. Consequently, relay R10 remains energized long enough to enable the punch clutch magnet PCM to be again energized to start the fourth cycle, this relay being kept energized through contacts R7B, R4B when contacts P5 open near the end of the third cycle. Coil R13H is deenergized early in the third cycle but relay R6P—R6H is held by contacts R7C and P11 until the fourth cycle. Thus, magnet CFM is kept energized until the middle of the fourth cycle.

Cycle IV

During this cycle the last card is deposited in pocket RP. Relay R7 is deenergized early in the cycle when contacts PCL open. Since relay R13P—R13H is now deenergized and contacts R13C are open, relay R10 cannot be held through contacts R4B. Contacts R1A, R8A, STC2, R5C, are now open and relay R10 is now held solely by contacts P5. Relay R6P—R6H is deenergized near the middle of the cycle and the opening of contacts R6B allows the deenergization of magnet CFM. However, the release of the dog 47 comes after arm 43 has rocked partly clockwise on its card ejection stroke and the tooth of dog 47 merely rides idly on the edge of arm 43 and picker 36 remains idle. Dog 47 relatches in tooth 43a when arm 43 has become fully retracted but the cam 39 dwells thereafter and another full cycle would be required to eject a card from the punch hopper PH. Contacts P5 hold relay R10 until the end of the cycle but the relay is deenergized before contacts P1 can impulse clutch magnet PCM and the card feeding mechanism comes to a stop at the end of the cycle.

Relays MR and R9 are kept energized by contacts CRC past the end of the cycle to ensure latching of the clutch dog controlled by magnet PCM but open thereafter and allow motor DM and the drive gearing to coast to a stop.

The foregoing description has dealt with the operation of the machine during normal conditions in which the run is completed without any interruption until the last plate has been analyzed and continues until the card corresponding to the lead plate has been stacked. In the case of the specific application of the machine chosen for purposes of illustration, namely, the feeding of addressing plates which also are used for printing upon the cards punched under control of the plates, it is necessary that the cards and plates are exactly in step. If it should happen that one or more cards or plates is missing, it puts either the cards or plates out of step with the other whereby the data derived from the tabs will be transcribed to the wrong card. It is necessary for this type of operation, therefore, to insure that there are no superfluous or missing cards or plates and, once the machine is started in operation, it must remain in step so that corresponding cards and plates will always be ejected together in the same cycle of machine operation.

If for any reason a hiatus or misoperation occurs, in either the feeding of the plates or the feeding of the cards, it is necessary to stop the machine and correct the error immediately otherwise all of the remaining cards will be incorrectly punched. It is for this reason that the machine circuits have been designed so that interruptions in the feeding of the cards or plates causes the machine to stop immediately and, in most cases, light lamp L to give the operator an opportunity to rectify the difficulty. As has already been seen from the foregoing description, the exhaustion of plates from the hopper APH causes the ejection of cards from the hopper PH to stop and the machine to continue running until the last corresponding cards and plates have been stacked.

If the punch hopper PH runs out of cards, the contacts PHC open with the ejection of the last card from the hopper and deenergizes relay R3. This opens the contacts R3A, R3B, and R3C, causing the machine to stop at the end of the cycle, since the relay R4 is left energized under this condition, holding the contacts R4B open and preventing the relay R10 from being held in the manner described above with respect to the last four cycles under the condition in which the plates run out before the cards. The opening of contacts R3C causes R5P—R5H to become deenergized thereby causing the signal light L to become lighted. When cards are again placed in the punch hopper PH, relay R3 is immediately reenergized and the machine can then be restarted in the same fashion described above by first closing the contacts STC1 manually and then closing the contacts STC2, the starting conditions differing only in that, due to the presence of cards in course of feed maintaining the contacts DCL and PCL closed, the machine resumes its operation without the necessity for holding the contacts STC2 closed for several cycles.

In the event that a card should jam in course of feed or the picker fails to feed a card from the hopper PH, one of the contacts DCL, PCL will open due to the gap in the cards which will be created. This will cause one of the relays R1, R7 to become deenergized, and possibly relay R13—R13H, in the event that contacts DCL open. This will cause the machine to stop when contacts P5 open at the end of the cycle due to inability to maintain the holding circuit for relay R10 through the contacts R1A, R7A. Under this condition, it is desirable to remove the plates and cards remaining in hoppers APH and PH and clear the machine of the cards in course of feed. The damaged card, if any, is removed and the plates and cards carefully checked to insure that they are in proper order and complete before operation of the machine is resumed.

If the gap is caused by failure of the card picker to feed a card, as most commonly happens, it is necessary to remove the cards and plates remaining in the hoppers PH and APH, respectively. The switches S1, S2, etc., may then be set to the solid line position and any cards remaining in course of feed may be removed by pressing the key controlling the contacts STC2. When switch S6 is placed in the solid line position, relay R5H is immediately energized and kept energized holding contacts R5C closed. Then, when the contacts STC2 are closed manually, the feeding of cards will start immediately, the switch S2 shunting the contacts R3B and R4A. The operation of the machine may be resumed, after checking the cards and plates against each other at the points where the interruption occurred, by setting the switches S1, S2, etc., back to the dotted line position and restarting the machine with contacts STC1, STC2 as first described above.

The signal light L does not light when the machine stops due to contacts DCL, PCL opening.

If a plate should jam in the hopper APH and fail to feed or if the plate should fail to seat itself properly in the analyzing position, one or more of the contacts PLC1, PLC2, PIC will be opened and stop the machine by deenergizing relay R5P—R5H, and at the same time lamp L is lighted. When this occurs, the machine should be cleared of cards and plates as in the case of a jammed card to make sure that operation will be resumed with the plates and cards in the proper matching relation.

It may happen that a plate is bent slightly; not enough to prevent its ejection from the hopper APH, but sufficiently to retard its ejection allowing the spring 104 to stretch so that the plate does not feed to the sensing position at the proper time. In this case the contacts PIC will still be open at the time the plate should have been fully ejected from the hopper APH. This will cause the machine to stop by deenergizing the relays R5P—R5H and R8. Lamp L is lighted in this case.

In the event the operator fails to place the follower plate on the stack of plates, the contacts WIC will be opened when the fifth plate from the end is ejected from the hopper APH and will stop the machine and light lamp L by deenergizing relays R5P, R5H, and R8. In this case, since there is nothing wrong with the cards or plates, the operator merely has to replace the weight and start the machine with contacts STC1, STC2 in the order named as described above.

When it is desired not to operate the machine with plates but to use the machine as a gang punch in the usual way, the switches S1 to S4, S6, and S7 are placed in solid line position to render ineffective the various controls which are concerned with the feeding and analysis of the plates and to enable the machine to be started with contacts STC2 alone. With switch S3 closed, the card lever and hopper contacts designated DCL, PHC, and PCL will function in the usual way to stop the machine in the event of a hiatus in the card feed. With switch S4 closed, relay R4 is kept continually energized breaking the circuit to the magnet CFM and permitting the cards to feed in the normal way, not withstanding the fact that relay R6P—R6H will be energized through closure of the contacts R7C of relay R7.

The machine may be stopped manually by opening the stop key contacts SPC or automatically when contacts FSC or FPC open due to the plate stacker or card pocket, respectively, becoming too full. The lamp L is not lighted under these circumstances.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination, record perforating mechanism for perforating code designations representing data, means to feed record cards to said mechanism; means to feed a succession of addressing plates, each plate bearing data designating elements which by their individual configurations represent different digits or characters, a plate analyzing station having contact means selectively operated by engagement with said elements, and a system of relays controlled by said contacts for controlling said perforating mechanism to punch said cards to correspond with the data represented by said elements.

2. In combination, record perforating mechanism including a series of punch magnets; means to feed a record to said perforating mechanism, means to feed a printing plate having data designating elements which by their different shapes represent different characters of a system of characters, means to sense the shapes of said data designating elements for each plate fed including electrical contact means selectively set to represent the character corresponding to each element borne by a plate, and means controlled by said contact means for selecting said punch magnets and operating said punch to perforate said record according to the elements on said plates.

3. In combination, a record perforating mechanism including a series of punch selecting magnets, means to present records to said perforating mechanism one at a time; means to feed a succession of printing plates, each plate being provided with one or more insertable tabs which by their shape represent different digits or characters of a character system; means for analyzing said tabs, including a plurality of feeler levers for each tab engageable therewith to sense the configuration of the tab; and contact means controlled by said feeler levers for closing circuits to said punch selecting magnets selectively according to the significance of the tabs.

4. In a machine of the class described, record perforating mechanism including a row of punches and means including a punch magnet for each punch for causing operation of said punches, means to feed a record past said row of punches, means to feed an address plate having removable members which by their configuration represent different digits or characters in a system of characters, plate analyzing means including contact means combinationally closed and opened according to the configuration of said members, means for energizing said magnets at different times in the feeding of the record to place perforations positionally therein, and means controlled by said contacts for controlling the last named means selectively.

5. In a machine of the class described, means for perforating an accounting and statistical record; means to feed a collection of printing plates, each plate having one or more removable data designating elements of different shapes to designate different parts of data; a series of sensing feelers engageable with the elements of each plate as it is fed by the plate feeding means, and means controlled by said feelers for controlling the perforating means according to the shapes of said elements whereby to perforate said record to correspond to the data represented by the elements on a plate.

6. In a machine of the class described, means for perforating an accounting and statistical record including a series of punch selecting magnets; means to feed a collection of printing members, each having data representations in the form of elements which by their different shapes represent different parts of data associated with each member; a plate sensing station for receiving said plates one at a time and having a series of feelers engaged by said elements and variably positioned according to the shapes of said elements, contact means selectively opened and closed by said feelers, and relay means selected by said contact means for selectively closing circuits to said magnets according to the shapes of said elements.

7. Analyzing mechanism for printing members having data representing elements which by their differences in shape represent different parts of data, comprising a series of levers differently positioned by said elements according to their shape, each element selectively controlling at least two of said levers; contact means including a series of contacts for each pair of levers and selectively closed by said levers singly or in different combinations according to the shapes of said elements, machine control means including a series of magnets one for each pair of levers, and means for closing circuits through said contact means to said magnets to cause the operation of said magnets in accordance with the parts of data represented by the shapes of said elements.

8. Analyzing mechanism for a machine of the class described in which there is provided means for feeding one at a time a succession of members having data representative elements of different shapes, each shape corresponding to a particular part of said data, such as a single digit of a number; comprising a series of sensing levers; means to move said sensing levers into engagement with said elements, said elements arresting said levers in different positions according to the shape of the elements sensed, each element controlling a plurality of said levers to arrest said levers in combinations of different positions representative of the shapes of said elements; contact means combinationally selectively opened and closed in accordance with positions of said levers, a system of relays, means to close circuits to said relays through said contacts to energize said relays singly or in different combinations, and means to close circuits through the contacts of said relays representative of the significance of the elements sensed by said levers.

9. In a machine of the class described, a driving motor, a circuit for controlling the driving motor, a supply hopper, means driven by said motor for ejecting an article from said hopper, a follower weight for a stack of articles placed in said hopper, and means to sense the presence of the follower weight and operative to cause an interruption in the circuit for said motor when the follower weight is not in place.

10. In a machine of the class described, a supply hopper, means for ejecting articles from said hopper one at a time, a follower weight for holding the articles flat in said hopper, and means controlled by said follower weight for causing the continuous ejection of articles from said hopper only when the follower weight is present in said hopper.

11. In a machine of the class described, a supply hopper for a collection of machine controlling elements, means for cyclically ejecting said elements one at a time from said hopper, and means controlled by said follower weight and operative a predetermined number of cycles prior to the ejection of the said machine element from the said hopper for stopping the ejection of machine elements in the event that the follower weight is not in place in the hopper.

12. In a machine of the class described, a supply hopper for a collection of articles to be ejected from said hopper one at a time, a follower weight for holding said articles in proper ejection position in said hopper, means for ejecting the said articles from said hopper one at a time, a driving motor for the ejecting means, a circuit for controlling the driving motor, contact means; a sensing element coacting with said articles and operative, in the event that the follower weight is not in place, to operate said contact means just prior to the exhaustion of the hopper; and a circuit for said motor controlled by said contact means.

13. A machine for transcribing data from printing plates each of which is provided with several data designating elements differently shaped to represent different characters, comprising a recording mechanism, means to sense the shapes of the data designating elements, and means controlled by said sensing means for controlling said recording mechanism in accordance with the shapes of said elements.

14. A machine for transcribing data from printing plates each of which is provided with a plurality of separate data designating elements which are differently shaped to represent different characters comprising recording mechanism including a series of control magnets, means to sense the shapes of the data designating elements including contact means selectively closed and opened according to the shapes of said elements, and means including a system of relays selectively controlled by said contact means and arranged to selectively close circuits to said magnets.

15. A machine for transcribing data from printing plates which are provided with data designating elements having a stepped configuration, each element by a combination of at least two steps of different dimensions representing a single character; comprising recording mechanism; means including a system of feeler levers, and at least a pair of levers for each element, for sensing the dimensions of the steps; and means selectively controlled by said levers for controlling the recording mechanism in accordance with said elements.

16. A machine for transcribing data from printing plates which are provided with data designating elements having a stepped configuration, each element, by a combination of at least two steps of different dimensions, representing a single character, comprising recording mechanism including a series of control magnets; means including a system of feeler elements, and at least two feeler elements for each designating element, for sensing the dimensions of said steps; contact means selectively combinationally closed and opened by said feeler elements to represent the part of data represented by each designating element, and means whereby said contact means closes circuits to said magnets to record the data represented by all of the designating elements.

ALBERT W. MILLS.

REFERENCES CITED

The following references are of record in the file of this patent:

UNITED STATES PATENTS

| Number | Name | Date |
|---|---|---|
| 1,950,479 | Carroll | Mar. 13, 1934 |
| 2,132,413 | Gollwitzer | Oct. 11, 1938 |
| 2,241,269 | Nelson | May 6, 1941 |
| 2,330,971 | Harrison | Oct. 5, 1943 |